US011854281B2

(12) United States Patent
Kaufman et al.

(10) Patent No.: US 11,854,281 B2
(45) Date of Patent: Dec. 26, 2023

(54) SYSTEM, METHOD, AND COMPUTER-ACCESSIBLE MEDIUM FOR PROCESSING BRAIN IMAGES AND EXTRACTING NEURONAL STRUCTURES

(71) Applicant: THE RESEARCH FOUNDATION FOR THE STATE UNIVERSITY OF NEW YORK, Albany, NY (US)

(72) Inventors: Arie Kaufman, Plainview, NY (US); Saeed Boorboor, Lake Grove, NY (US)

(73) Assignee: The Research Foundation for the State University of New York, Albany, NY (US)

(*) Notice: Subject to any disclaimer, the term of this patent is extended or adjusted under 35 U.S.C. 154(b) by 391 days.

(21) Appl. No.: 16/994,885

(22) Filed: Aug. 17, 2020

(65) Prior Publication Data
US 2021/0049338 A1 Feb. 18, 2021

Related U.S. Application Data

(60) Provisional application No. 62/887,719, filed on Aug. 16, 2019.

(51) Int. Cl.
G06V 20/69 (2022.01)
G06T 7/00 (2017.01)

(52) U.S. Cl.
CPC .......... *G06V 20/695* (2022.01); *G06T 7/0012* (2013.01); *G06T 2207/10056* (2013.01);
(Continued)

(58) Field of Classification Search
CPC .... G06V 20/695; G06V 20/69; G06T 7/0012; G06T 2207/10056; G06T 2207/20021;
(Continued)

(56) References Cited

U.S. PATENT DOCUMENTS 6,249,693 B1 6/2001 Cline
6,438,403 B1 8/2002 Cline
(Continued)

FOREIGN PATENT DOCUMENTS

CN 108601552 A 9/2018
CN 110770792 A 2/2020
(Continued)

OTHER PUBLICATIONS

Hang et al. "APP2: automatic tracing of 3D neuron morphology based on hierarchical pruning of a gray-weighted image distance-tree" (Year: 2013).*
(Continued)

*Primary Examiner* — Vu Le
*Assistant Examiner* — Winta Gebreslassie
(74) *Attorney, Agent, or Firm* — ACKnowledge IP P.C.; Paul Ackerman

(57) ABSTRACT

An exemplary system, method, and computer-accessible medium for generating an image(s) of an anatomical structure(s) in a biological sample(s) can include receiving first wide field microscopy imaging information for the biological sample, generating second imaging information by applying a gradient-based distance transform to the first imaging information, and generating the image(s) based on the second imaging information. The second imaging information can be generated by applying an anisotropic diffusion procedure to the first imaging information. The second imaging information can be generated by applying a curvilinear filter and a Hessian-based enhancement filter after the application of the gradient-based distance transform. The second information can be generated by applying (i) a tube enhancement procedure or (ii) a plate enhancement procedure after the application of the gradient-based distance transform.

22 Claims, 16 Drawing Sheets

(52) U.S. Cl.
CPC ............... *G06T 2207/20021* (2013.01); *G06T 2207/30016* (2013.01); *G06T 2207/30024* (2013.01)

(58) Field of Classification Search
CPC  G06T 2207/30016; G06T 2207/30024; G16H 30/40
USPC ......................................................... 382/133
See application file for complete search history.

(56) References Cited

U.S. PATENT DOCUMENTS

| | | | |
|---|---|---|---|
| 6,909,797 B2 | 6/2005 | Romsdahl | |
| 7,224,357 B2 | 5/2007 | Chen | |
| 7,409,108 B2 | 8/2008 | Xu et al. | |
| 7,574,031 B2 | 8/2009 | Dehmeshki | |
| 8,358,819 B2 | 1/2013 | Wu | |
| 8,571,277 B2 | 10/2013 | Suri | |
| 8,620,055 B2 | 12/2013 | Barratt et al. | |
| 8,644,578 B1 | 2/2014 | Wiley | |
| 8,805,122 B1 | 8/2014 | Periaswamy | |
| 9,269,144 B2 | 2/2016 | Kraus et al. | |
| 9,349,184 B2 | 5/2016 | Hirst Dowson | |
| 9,978,150 B2 | 5/2018 | Dror | |
| 10,041,515 B2 | 8/2018 | Salomie | |
| 10,194,829 B2 | 2/2019 | Kaditz | |
| 10,222,441 B2 | 3/2019 | Kaditz et al. | |
| 10,354,418 B2 | 7/2019 | Recur et al. | |
| 10,359,486 B2 | 7/2019 | Kaditz et al. | |
| 10,482,634 B2 | 11/2019 | Jain | |
| 10,607,378 B2 | 3/2020 | Jarisch | |
| 10,813,614 B2 | 10/2020 | Behrooz | |
| 10,869,608 B2 | 12/2020 | Dormer et al. | |
| 11,276,175 B2 | 3/2022 | Witte | |
| 2002/0141627 A1 | 10/2002 | Romsdahl | |
| 2003/0068074 A1 | 4/2003 | Hahn | |
| 2003/0194119 A1 | 10/2003 | Manjeshwar | |
| 2005/0123181 A1 | 6/2005 | Freund | |
| 2005/0169526 A1 | 8/2005 | Romsdahl | |
| 2005/0271276 A1 | 12/2005 | Liang | |
| 2006/0153451 A1 | 7/2006 | Hong | |
| 2006/0290695 A1 | 12/2006 | Salomie | |
| 2007/0031019 A1 | 2/2007 | Lesage | |
| 2008/0150937 A1 | 6/2008 | Lundstrom | |
| 2008/0198161 A1 | 8/2008 | Schiwietz | |
| 2008/0260221 A1 | 10/2008 | Unal | |
| 2009/0039235 A1 | 2/2009 | MacFarlane | |
| 2009/0039886 A1 | 2/2009 | White | |
| 2009/0041316 A1* | 2/2009 | Koos ................... G06V 20/693 382/128 |
| 2009/0046915 A1 | 2/2009 | Hou | |
| 2009/0129671 A1 | 5/2009 | Hu | |
| 2009/0322748 A1 | 12/2009 | Chen | |
| 2010/0074486 A1 | 3/2010 | Broser et al. | |
| 2010/0296709 A1 | 11/2010 | Yaron | |
| 2011/0050703 A1 | 3/2011 | Artan | |
| 2011/0081062 A1 | 4/2011 | Li | |
| 2011/0181893 A1 | 7/2011 | MacFarlane | |
| 2011/0286654 A1 | 11/2011 | Krishnan | |
| 2012/0106816 A1 | 5/2012 | Kristiaan | |
| 2012/0194646 A1 | 8/2012 | Chiang | |
| 2013/0010917 A1 | 1/2013 | Thibault | |
| 2013/0016886 A1 | 1/2013 | Schoenmeyer | |
| 2013/0077892 A1 | 3/2013 | Ikeno | |
| 2013/0243287 A1 | 9/2013 | Thomson | |
| 2013/0315448 A1 | 11/2013 | Fletcher | |
| 2013/0338484 A1 | 12/2013 | Huang | |
| 2014/0348410 A1 | 11/2014 | Grunkin et al. | |
| 2016/0260208 A1 | 9/2016 | Rapaka et al. | |
| 2016/0275681 A1 | 9/2016 | D'Alessandro | |
| 2016/0300343 A1 | 10/2016 | Gazit | |
| 2017/0039725 A1 | 2/2017 | Dror | |
| 2017/0103504 A1* | 4/2017 | Jiménez Cisneros ....................... G06V 20/698 |
| 2017/0220900 A1 | 8/2017 | Boada | |
| 2017/0249744 A1 | 8/2017 | Wang | |
| 2018/0061066 A1 | 3/2018 | Frise | |
| 2018/0156713 A1 | 6/2018 | Berezhna et al. | |
| 2018/0267700 A1 | 9/2018 | Kaditz | |
| 2019/0139223 A1 | 5/2019 | Nie | |
| 2019/0139236 A1 | 5/2019 | Cheng | |
| 2019/0384047 A1 | 12/2019 | Johnson | |
| 2020/0265618 A1 | 8/2020 | Chen | |
| 2021/0082595 A1* | 3/2021 | Zheng ................... G02B 21/365 |
| 2021/0271853 A1* | 9/2021 | Cotte ................... G06V 20/695 |

FOREIGN PATENT DOCUMENTS

| | | |
|---|---|---|
| DE | 102004046237 A1 | 7/2005 |
| EP | 3156967 A2 | 4/2017 |
| EP | 3397166 A1 | 11/2018 |
| EP | 3807845 B1 | 4/2022 |
| JP | 2013524369 A | 6/2013 |
| JP | 5520378 B2 | 6/2014 |
| JP | 2015096196 A | 5/2015 |
| JP | 5832523 B2 | 12/2015 |
| JP | 6437652 B2 | 12/2018 |
| JP | 2019520120 A | 7/2019 |
| JP | 2019525405 A | 12/2019 |
| WO | 2006093564 A9 | 11/2006 |
| WO | 2007105107 A2 | 9/2007 |
| WO | 2014165091 A2 | 10/2014 |
| WO | 2016007518 A1 | 1/2016 |
| WO | 2016128965 A2 | 8/2016 |

OTHER PUBLICATIONS

Boorboor, Saeed et al., "Visualization of Neuronal Structures in Wide-Field Microscopy Brain Images" IEE Transactions on Visualization and Computer Graphics, vol. 25, No. 1, pp. 1018-1028, Jan. 2019.

Narayanaswamy, Arunachalam et al., "3-D Image Pre-processing Algorithms for Improved Automated Tracing of Neuronal Arbors" Neuroinform, vol. 9, vol. 219-231, 2011.

Valdecasas, A.G. et al., "On the extended depth of focus algorithms for bright field microscopy" Micron, vol. 32, pp. 559-569, 2001.

Meijering, E. et al., "Design and Validation of a Tool for Neurite Tracing and Analysis in Fluorescence Microscopy Images" Cytometry Part A, vol. 58A, pp. 167-176, 2004.

Peng, Hanchuan et al., "BigNeuron: Large-Scale 3D Neuron Reconstruction from Optical Microscopy Images" Neuron, vol. 87, pp. 252-256, Jul. 15, 2015.

Song, Wenjun et al., "Assessing Mitochontrial Morphology and Dynamics using Fluorescence wide-field Microscopy and 3D Image Processing" Methods, vol. 46, pp. 295-303, 2008.

* cited by examiner

160

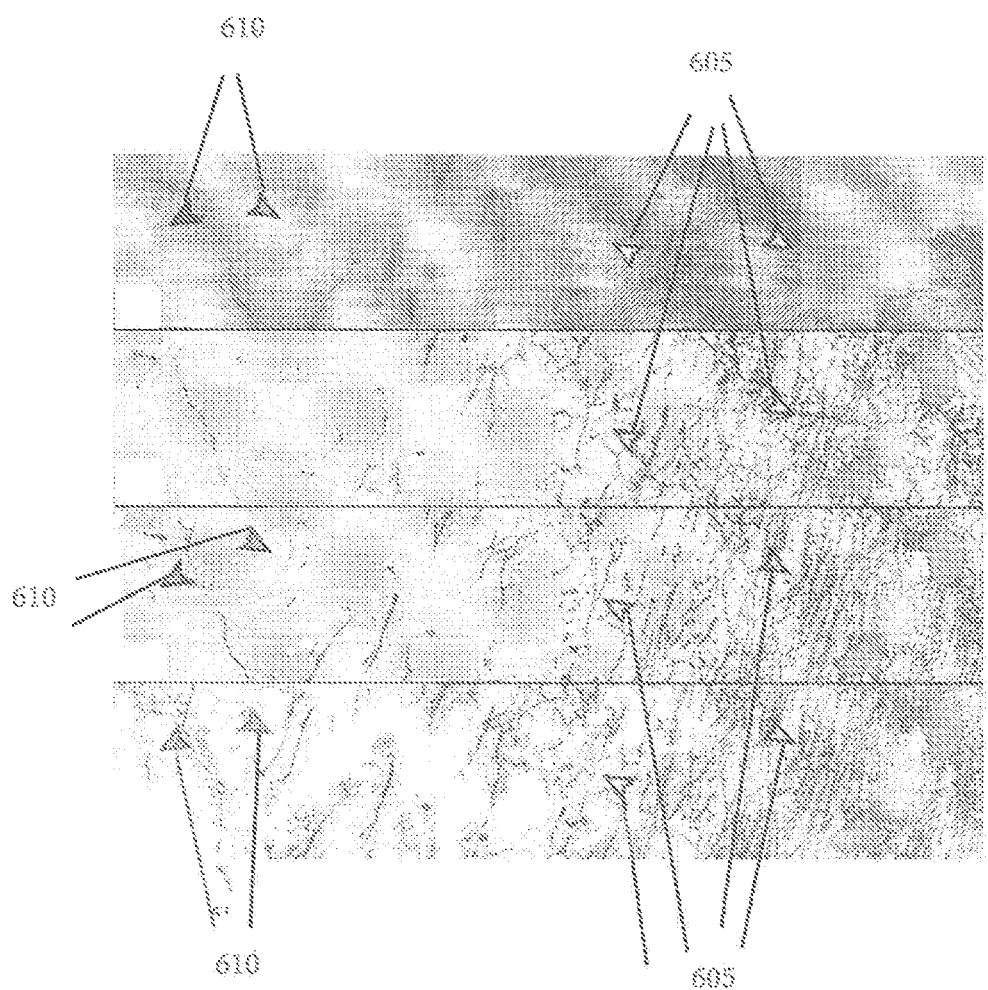

SYSTEM, METHOD, AND COMPUTER-ACCESSIBLE MEDIUM FOR PROCESSING BRAIN IMAGES AND EXTRACTING NEURONAL STRUCTURES

CROSS-REFERENCE TO RELATED APPLICATION(S)

This application relates to and claims priority from U.S. Patent Application No. 62/887,719, filed on Aug. 16, 2019, the entire disclosure of which is incorporated herein by reference.

STATEMENT REGARDING FEDERALLY SPONSORED RESEARCH

This invention was made with government support under Grant No. CNS1650499, awarded by the National Science Foundation and Grant No. HL127522, awarded by the National Institutes of Health. The government has certain rights in the invention.

FIELD OF THE DISCLOSURE

The present disclosure relates generally to microscopy, and more specifically, to exemplary embodiments of an exemplary system, method, and computer-accessible medium for processing brain images and extracting neuronal structures with wide-field microscopy.

BACKGROUND INFORMATION

The understanding of neural connections that underline brain function is central to neurobiology research. Advances in microscopy technology have been instrumental in furthering this research through the study of biological specimens. High-resolution images of brain samples obtained using optical microscopes (e.g., average resolution of 200 nm/pixel) and electron microscopes (e.g., average resolution of 3 nm/pixel) have made it possible to retrieve micro- and nano-scale three-dimensional ("3D") anatomy of the nervous system. The field of connectomics (see, e.g., Reference 47), and relevant studies in image processing have developed methods for the reconstruction, visualization, and analysis of complex neural connection maps. Insights gained from these reconstructed neuron morphologies, often represented as 3D structures and two-dimensional ("2D") graph layouts, can be beneficial to the understanding of human brain diseases.

A wide-field ("WF") microscope (see, e.g., Reference 55), is a type of fluorescence microscope that neurobiologists may employ since it can image a biological sample orders of hours faster than a confocal microscope. For example, imaging a 40× slice of a sample using a confocal microscope can take 15 hours, whereas a WF microscope can take only approximately 1.5 hours for the same sample. Moreover, WF microscopy ("WFM") scanners are thousands of dollars cheaper and cause minimal photobleaching to the specimens, in comparison to a confocal or electron microscope. However, due to its optical arrangement, a WF microscope collects light emitted by fluorescent-tagged biological targets in the focal plane in addition to all of the light from illuminated layers of the sample above and below the focal plane. (See e.g., FIG. 3). As a result, the acquired images can suffer from degraded contrast between foreground and background voxels due to out-of-focus light swamping the in-focus information, low signal-to-noise ratio, and poor axial resolution. Thus, analysis and visualization of WF data can be a challenge for domain experts.

Most available procedures for 3D visualization of neuronal data are designed specifically for electron microscopy (see, e.g., Reference 14), and confocal microscopy (see, e.g., Reference 52). Transfer function designs for the volume rendering of microscopy images (see, e.g., References 6 and 53), do not yield effective results when applied to WFM images. Further, the accuracy of neuron tracing and morphology reconstruction procedures depend on pre-processing image restoration steps. (See, e.g., Reference 28). 3D deconvolution procedures (see, e.g., Reference 40) attempt to reverse the out-of-focus blur and restore the 3D WFM images with improved contrast and resolution. However, they are complex and time-consuming to compute, often requiring rounds of iterative approximations to produce the corrected image (see, e.g., Reference 45), and depend on detailed parameter inputs. These limitations compel neurobiologists to use rudimentary methods, such as manually traversing 2D slices of the volumetric image, or maximal intensity projections, for better visibility of features at the cost of losing 3D information.

Qualitative analysis. Volume rendering systems have been developed for visualizing, segmenting, and stitching microscopy data. Such known methods can be used for the 3D reconstruction of cellular structures in optical microscopy data sets and correcting axial undersampling artifacts. (See, e.g., Reference 26). An interactive rendering tool can be used for confocal microscopy data that can combine the rendering of multi-channel volume data and polygon mesh data. (See, e.g., Reference 53). Other known microscopy visualization tools can be used for visualization, segmentation, and stitching analysis of large electron microscopy datasets. (See, e.g., Reference 14). These procedures can be used for confocal, two-photon, or electron micropcopy data, where the acquired images contain only the light emitted by the points in the focal plane. However, due to out-of-focus light spreading through the WFM data and its poor axial resolution, the naïve application of these procedures on WFM data, may not produce effective visualizations.

Other suitable procedures can be used to segment or classify voxels based on neuronal structures. A surface representation procedure can be used for the reconstruction of neuron dendrites and spines from optical microscopy data. (See, e.g., Reference 13). As a pre-processing procedure, this procedure can utilize the deconvolution of the microscopy images. Transfer function can be used for two-photon microscopy volumes based on feature spaces. (See, e.g., Reference 27). The feature space explored for the visualization of neural structures included local voxel average, standard deviation, and z-slice correlation. These features may not be ineffective for WFM data, because the intensity values due to the super-imposition of light emitted from the neurons can be greater than weak neurons and there is a low correlation for thin neuronal structures within z-slices. This makes transfer function adjustment an arduous task for neurobiologists. Close to neuron morphology, an automatic procedure to tune ID transfer functions based on local intensity shift in vessel visualization has been proposed. (See, e.g., Reference 18). However, overlapping intensity ranges of the out-of-focus light and neuronal structures make this procedure inapplicable to WFM datasets.

Quantitative analysis. Neuron tracing procedures and the field of connectomics were introduced for the quantitative analysis of neuron morphology and functioning. Connectomics (see, e.g., Reference 47) aims to develop methods to reconstruct a complete map of the nervous system (see, e.g., References 2, 4, and 57), and the connections between neuronal structures. (See, e.g., References 15, 23, and 46). Neuron tracing procedures are designed to automatically or interactively extract the skeletal morphology of neurons. Available tools, such as NeuronJ (see, e.g., Reference 24), Reconstruct (see, e.g., Reference 9), NeuroLucida 360 (see, e.g., Reference 22), and Vaa3D (see, e.g., Reference 32), provide procedures for semi-automatic interactive tracing and editing of neurons. Automated tracing procedures use either global approaches (see, e.g., References 8, 20, 49, 54, and 56), or local cues (see, e.g., References 3, 39, and 58), to trace neuronal skeletal structures.

Image processing of WFM data. The optical arrangement of a WF microscope lacks the capability to reject out-of-focus light emitted by fluorescent-tagged biological targets. The mathematical representation of this blurring is called a point spread function ("PSF"), which can be determined experimentally (see, e.g., Reference 43), or modeled theoretically. (See, e.g., References 5, 11, and 36). However, it can depend on a detailed set of microscopy parameters and is subject to changes in the experimental procedure. Deconvolution is an image processing procedure designed to reverse the attenuation caused by the PSF and to restore, as far as possible, the image signals to their true values. Often, deconvolution procedures are iterative since they follow an expectation-maximization framework. (See, e.g., References 21 and 37). Blind deconvolution procedures (see, e.g., Reference 19), are used to bypass the need for PSF modeling or for cases where the parameters for PSF estimation are unknown. DeconvolutionLab2 (see, e.g., Reference 38), is an open-source software that contains a number of standard deconvolution procedures commonly used by neurobiologists. Even though deconvolution is an effective procedure for restoring microscopy images, the time and memory requirements to process large microscopy images make them less practical for regular use by domain experts.

Immersive Visualization. Immersive visualization systems tap into the human peripheral vision and allow a more effective exploration of three- and higher dimensional datasets. A user study on the exploration of confocal microscopy datasets on different visualization systems was performed. (See, e.g., Reference 35). The findings reflected that, for qualitative analysis tasks, users perform better in immersive virtual reality environments. An examination was performed on how immersive systems affect the performance of common visualization tasks. (See, e.g., Reference 17). The studies showed that immersive visualization environments improve the users' understanding of complex structures in volumes. Specifically in neurobiology, a system was designed for interactive tracing of neurons, using consumer-grade virtual reality technology. (See, e.g., Reference 51).

Thus, it may be beneficial to provide an exemplary system, method, and computer-accessible medium for processing brain images and extracting neuronal structures, which can overcome at least some of the deficiencies described herein above.

SUMMARY OF EXEMPLARY EMBODIMENTS

An exemplary system, method, and computer-accessible medium for generating an image(s) of an anatomical structure(s) in a biological sample(s) can include receiving first wide field microscopy imaging information for the biological sample, generating second imaging information by applying a gradient-based distance transform to the first imaging information, and generating the image(s) based on the second imaging information. The second imaging information can be generated by applying an anisotropic diffusion procedure to the first imaging information. The second imaging information can be generated by applying a curvi-linear filter and a Hessian-based enhancement filter after the application of the gradient-based distance transform. The second information can be generated by applying (i) a tube enhancement procedure or (ii) a plate enhancement procedure after the application of the gradient-based distance transform. Tubular structures in the first imaging information can be extracted using the tube enhancement procedure, and cell bodies in the first imaging information can be extracted using the plate enhancement procedure.

In some exemplary embodiments of the present disclosure, the second imaging information can be an opacity map. The gradient-based distance transform can include determining a global minimum intensity value based on voxels in the first imaging information. The gradient-based distance transform can further include determining a seed voxel(s) based on the global minimum intensity value. The gradient-based distance transform can further includes determining an intensity value for neighboring voxels of the seed voxel(s), determining a particular neighbor voxel of the neighboring voxels that has a highest intensity, and adding the intensity value for the seed voxel(s) to the particular neighbor voxel. The gradient-based distance transform can further include (a) determining the intensity value for further neighboring voxels of the particular neighbor voxel, (b) determining a further particular neighbor voxel of the further neighboring voxels that has the highest intensity, (c) adding the intensity value for particular neighbor voxel to the further particular neighbor voxel, and (d) iterating procedures (a)-(c).

In certain exemplary embodiments of the present disclosure, the gradient-based distance transform can include determining the global minimum intensity value for each z-slice in the first imaging information. The imaging information can be split into a plurality of tiles, the second imaging information can be generated by separately applying the gradient-based distance transform to each of the tiles, and the image(s) can be generated by stitching together the second imaging information. The gradient-based distance transform can be applied to identify (i) in-focus voxels in the first imaging information and (ii) out-of-focus voxels in the first imaging information, minimize an effect of the out-of-focus voxels, and maximizing the effect of the in-focus voxels. The image(s) can be gigapixel image(s) having a 360° horizontal field-of-view. The image(s) can include (i) a bounded view of the anatomical structure(s), (ii) a structural view of the anatomical structure(s), or (iii) a classification view of the anatomical structure(s). The anatomical structure(s) can be a neurite(s) or a cell body(ies). The biological sample(s) can be brain tissue.

Additionally, an exemplary system, method, and computer-accessible medium for generating an image(s) of an anatomical structure(s) in a biological sample(s) can include receiving wide-field microscopy imaging information for the biological sample, identifying (i) in-focus voxels in the imaging information and (ii) out-of-focus voxels in the imaging information, minimizing an effect of the out-of-focus voxels with a penalized voxel weighting, maximizing the effect of the in-focus voxels, and generating the image(s) based on the minimized out-of-focus voxels and the maximized in-focus voxels.

Further, an exemplary system, method, and computer-accessible medium for visualizing wide-field microscopy (WF) imaging information can include receiving WF imaging information related to a region of interest of an anatomical structure(s), partitioning the WF imaging information into a plurality of first image tiles, generating a plurality of second image tiles including by applying feature extraction procedure to the first image tiles including penalizing out of focus voxels in a particular image tile of the first image tiles and rewarding in focus voxels in the particular image tile to extract cell features, stitching the second image tiles into a visualization data set, and performing the visualization based on the stitched second image tiles.

In some exemplary embodiments of the present disclosure, the second image tiles can be generated by performing an anisotropic diffusion or on each of the first image tiles. The second image tiles can be generated by performing a gradient-based distance transform on each of the first image tiles. The second image tiles can be generated by performing a tube enhancement procedure and a plate enhancement procedure on each of the first image tiles.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIG. 6A is an image of the raw wide-field microscopy brain volume according to an exemplary embodiment of the present disclosure;

FIG. 6B is an image showing an application of the gradient-based distance transform according to an exemplary embodiment of the present disclosure;

FIG. 6C is an image illustrating improvements in neurite extraction due to an anisotropic diffusion term according to an exemplary embodiment of the present disclosure;

FIG. 6D is an image illustrating improvements due to the introduction of a distance condition according to an exemplary embodiment of the present disclosure;

Figure 1A:
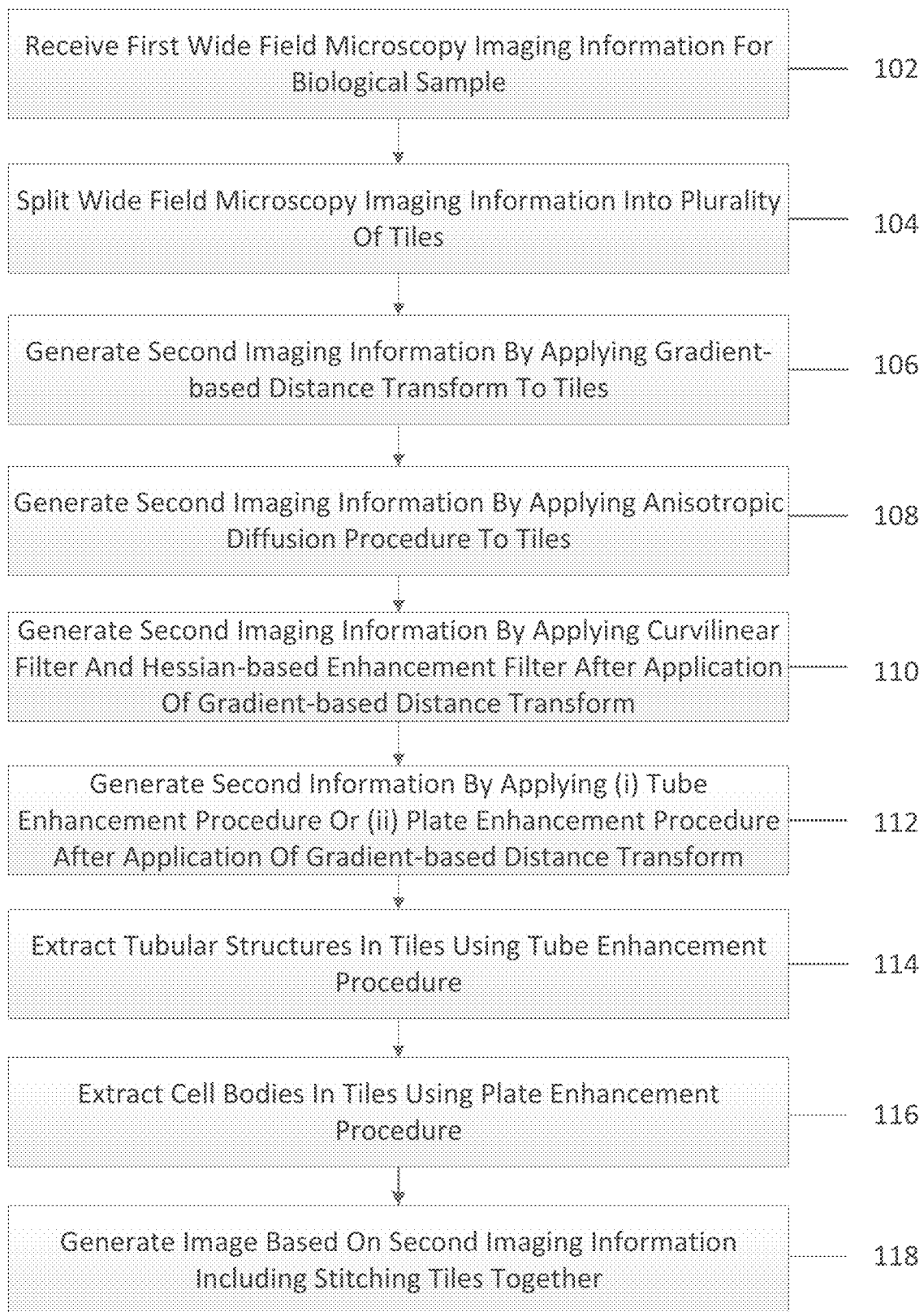
FIGS. 1A and 1B are flow diagrams of methods for generating an image of an anatomical structure in a biological sample according to an exemplary embodiment of the present disclosure.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

FIG. 1A is a flow diagram of a method 100 for generating an image of an anatomical structure in a biological sample.

For example, at procedure 102, first wide field microscopy imaging information for the biological sample can be received. At procedure 104, the wide field microscopy imaging information can be split into a plurality of tiles. At procedure 106, a gradient-based distance transform can be applied to the tiles. The gradient-based distance transform can include determining a global minimum intensity value based on voxels in the first imaging information and determining one or more seed voxels based on the global minimum intensity value. The gradient-based distance transform can also include determining an intensity value for neighboring voxels of the one or more seed voxels, determining a particular neighbor voxel of the neighboring voxels that has a highest intensity, and adding the intensity value for the one or more seed voxels to the particular neighbor voxel.

The gradient-based distance transform can further include (a) determining the intensity value for further neighboring voxels of the particular neighbor voxel, (b) determining a further particular neighbor voxel of the further neighboring voxels that has the highest intensity, (c) adding the intensity value for particular neighbor voxel to the further particular neighbor voxel, and (d) iterating procedures (a)-(c). The gradient-based distance transform can include determining the global minimum intensity value for each z-slice in the first imaging information. The gradient-based distance transform can be applied to identify (i) in-focus voxels in the first imaging information and (ii) out-of-focus voxels in the first imaging information, and minimize an effect of the out-of-focus voxels, and maximize the effect of the in-focus voxels.

At procedure 108, an anisotropic diffusion procedure can be applied to the tiles. At procedure 110, a curvilinear filter and a Hessian-based enhancement filter can be applied after the application of the gradient-based distance transform. At procedure 112, a tube enhancement procedure or a plate enhancement procedure can be applied after the application of the gradient-based distance transform. At procedure 114, tubular structures in the tiles can be extracted using the tube enhancement procedure. At procedure 116, cell bodies in the tiles can be extracted using the plate enhancement procedure. At procedure 118, the image can be generated based on the second imaging information including stitching the tiles together. Alternatively, as discussed herein, the above procedure can be applied without splitting the wide-field microscopy imaging information into a plurality of tiles.

Figure 1B:
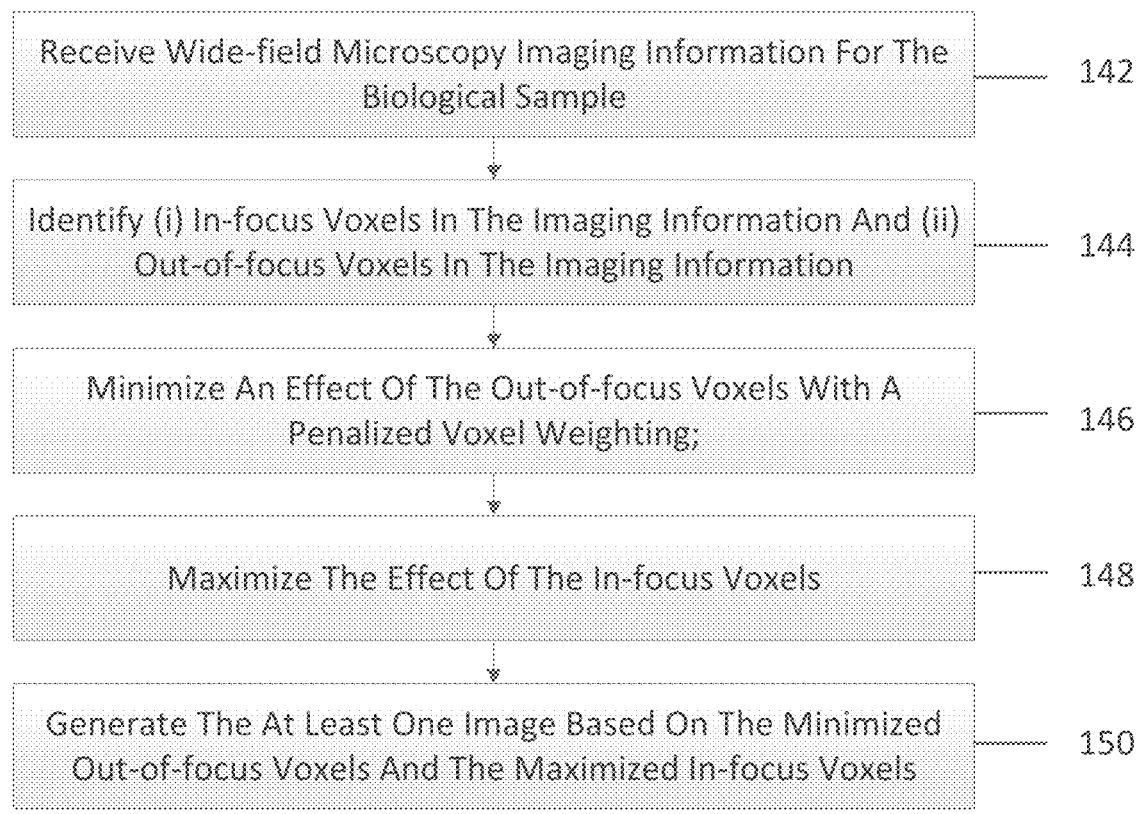

FIG. 1B is a flow diagram of a method 140 for generating an image of an anatomical structure in a biological sample. For example, at procedure 142, wide-field microscopy imaging information for the biological sample can be received. At procedure 144, (i) in-focus voxels in can be identified in the wide-field microscopy imaging information and (ii) out-of-focus voxels can be identified in the wide-field microscopy imaging information. At procedure 146, an effect of the out-of-focus voxels can be minimized with a penalized voxel weighting. At procedure 148, an effect of the in-focus voxels can be maximized. At procedure 150, the image can be generated based on the minimized out-of-focus voxels and the maximized in-focus voxels.

Figure 1C:
FIG. 1C is a flow diagram of a method for visualizing wide-field microscopy imaging information according to an exemplary embodiment of the present disclosure.

FIG. 1C is a flow diagram of a method 160 for visualizing wide-field microscopy imaging information. For example, at procedure 162, wide-field microscopy imaging information related to a region of interest of an anatomical structure can be received. At procedure 164, the wide-field microscopy imaging information can be split into a plurality of first image tiles. At procedure 166, a feature extraction procedure can be applied to the first image tiles including penalizing out of focus voxels in a particular image tile of the first image tiles and rewarding in focus voxels in the particular image tile to extract cell features. At procedure 168, an anisotropic diffusion procedure can be performed on each of the first image tiles. At procedure 170, a gradient-based distance transform can be performed on each of the first image tiles. At procedure 172, a tube enhancement procedure and a plate enhancement procedure can be performed on each of the first image tiles. At procedure 174, the second image tiles can be stitched into a visualization data set. At procedure 176, the visualization can be performed based on the stitched second image tiles.

The exemplary system, method, and computer-accessible medium can be used to process brain images and extracting neuronal structures for visualization. The exemplary system, method, and computer-accessible medium can extract neuronal structures from microscopy images of brain slices. Through image-processing procedures, the exemplary system, method, and computer-accessible medium can substantially reduce the effects of out-of-focus light that can occlude the complex nanoscale neuronal structures in images from wide-field microscopes. The output from the exemplary system, method, and computer-accessible medium can be volumetric visualizations, and/or virtual reality displays.

The exemplary system, method, and computer-accessible medium can utilize efficient visualization-driven methods, rather than employing computationally demanding and time-consuming image processing techniques as a more practical solution in the daily workflow of neurobiologists. Currently available systems for the abstraction, tracing, and mapping of neuronal structures are designed for high resolution microscopes, such as two-photon, confocal, and electronic microscopes, which are substantially more expensive and take more time to image the biological specimen, compared to a wide-field microscope. Using the exemplary system, method, and computer-accessible medium, researchers can use noisy microscopy data, such as wide-field microscopy images, or other microscopy images, to obtain useful high resolution images.

The exemplary system, method, and computer-accessible medium can extract neuronal structures from microscopy, such as wide-field microscopy images of brain slices. Through image-processing procedures, the exemplary system, method, and computer-accessible medium can substantially reduce the effect of out of focus light that can occlude the complex nanoscale neuronal structures, caused by the design of wide-field microscopes. The output from the exemplary system, method, and computer-accessible medium can be volumetric visualizations, such as three visualization datasets (e.g., bounded, structural, and the classification views). Additionally, a virtual reality display can be utilized, as a cluster for the processing and visualization of large, high-resolution, microscopy data that can be instrumental for future research in neurobiology.

The exemplary system, method, and computer-accessible medium can include a gradient-based distance transform function, followed by the use of structural filters to extract vessel-like neurites and plate-like cell bodies from the input microscopy images. The exemplary system, method, and computer-accessible medium can automatically divide the dataset into smaller tiles for computational parallelization and stitch back the processed tiles to output full volume datasets for the three visualization modes. The gradient-based distance transform function can be modeled based on the emission of light in the biological sample under a wide-field microscope and penalizes voxels that contribute to the out-of-focus blur, effectively recovering neurites with weak intensities.

The exemplary system, method, and computer-accessible medium can include a pipeline for the visualization of WFM brain images. Rather than employing computationally demanding and time-consuming image processing procedures, the exemplary system, method, and computer-accessible medium can utilize a specialized variant of a distance transform procedure referred to herein as a gradient-based distance transform function. Applying a curvilinear line filter (see, e.g., Reference 41), and a Hessian-based enhancement filter to the computed distance field, an opacity map for the extraction of neurites (e.g., axons and dendrites) and cell bodies can be generated, respectively, from raw WFM data. The effective visualization and exploration of complex nano-scale neuronal structures in WFM images can be facilitated by generating three visualization datasets: (i) bounded, (ii) structural, and (iii) classification views. This eliminates the occlusion and clutter due to out-of-focus blur.

Figures 2A, 2B, 2C:
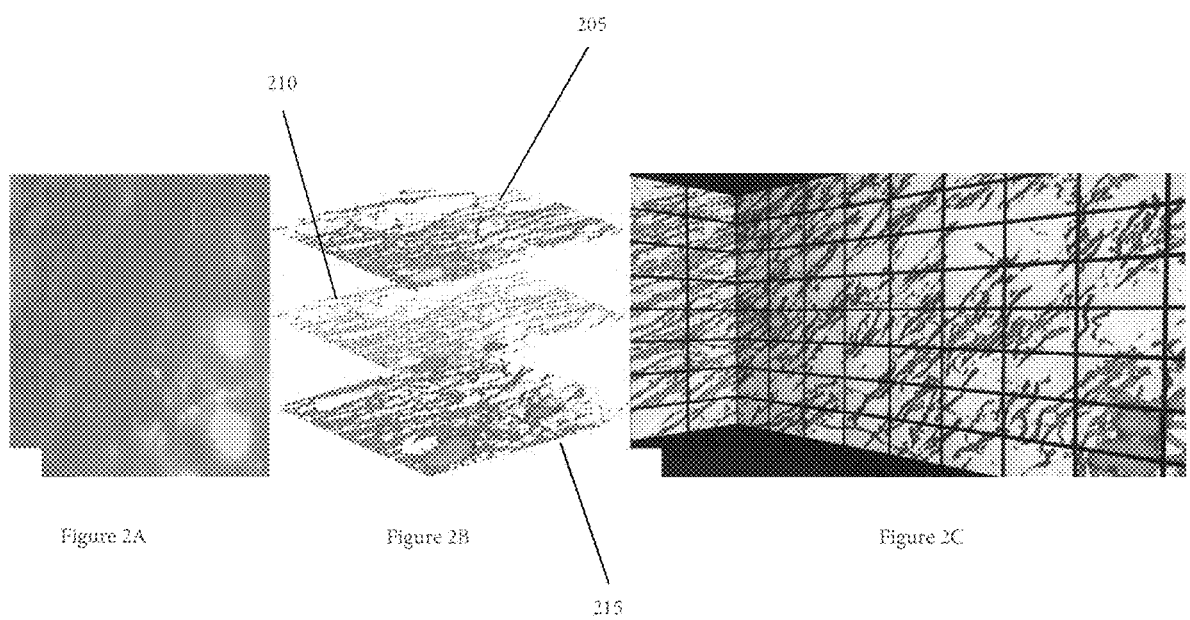
FIG. 2A is a volume rendering of an unprocessed wide-field microscopy volume of a brain slice according to an exemplary embodiment of the present disclosure.
FIG. 2B is an image illustrating different visualization modes provided by the exemplary system, method, and computer-accessible medium according to an exemplary embodiment of the present disclosure.
FIG. 2C is a visualization produced using the exemplary system, method, and computer-accessible medium shown using a reality deck according to an exemplary embodiment of the present disclosure.

FIG. 2A is a volume rendering of an unprocessed widefield microscopy volume of a brain slice according to an exemplary embodiment of the present disclosure. FIG. 2B is an image illustrating different visualization modes provided by the exemplary system, method, and computer-accessible medium according to an exemplary embodiment of the present disclosure. In particular, FIG. 2B illustrates bounded view 205, structural view 210, and classification view 215. FIG. 2C is a visualization produced using the exemplary system, method, and computer-accessible medium shown using a reality deck according to an exemplary embodiment of the present disclosure;

The exemplary system, method, and computer-accessible medium facilitates the visualization of results without having to adjust image-correction parameters and transfer functions for the retrieval of useful information. In addition to being more efficient, the exemplary system, method, and computer-accessible medium can yield better visualization of neuronal structures compared to results from publicly available deconvolution software, as well as compared to confocal microscopy volumes of the same specimen.

Figure 4A:
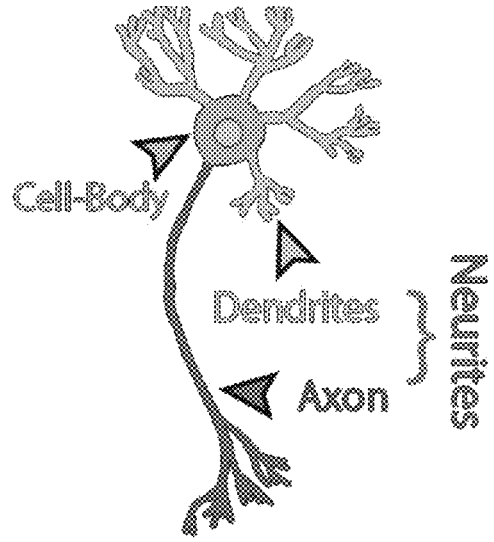
FIG. 4A is a diagram illustrating a simplified anatomy of a neuron.
Figure 4B:
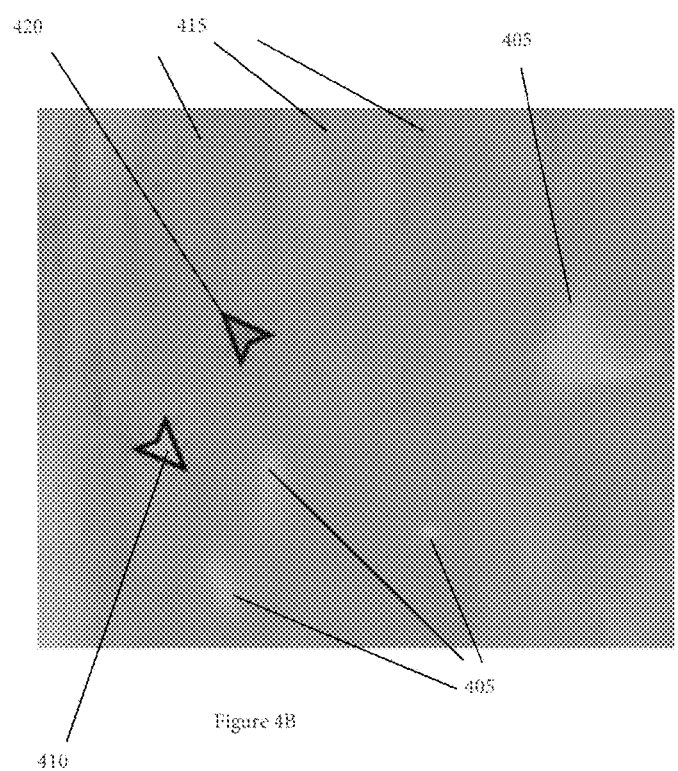
FIG. 4B is an image of a neuron seen under a wide-field microscope according to an exemplary embodiment of the present disclosure.

Thresholding can be used for the removal of the out-of-focus blur contamination in WFM brain images. This, however, can pose two problems: (i) in the process of removing noise, thresholding may also remove neurites and cellbodies with lower intensities, and (ii) since the biological targets do not emit light uniformly, thresholding can cause 'holes' or create discontinuity within the structure. In contrast, the exemplary system, method, and computer-accessible medium can be used to analyze the 3D structure of the neurites (see e.g., FIG. 4A which shows the anatomy of a neuron) and cell-bodies (see e.g., FIG. 4B which shows neurons seen under a wide-field microscope) without losing information due to thresholding. Spots 405 shown in FIG. 4B, which are indicated by arrow 410, are the cell bodies and the remaining thread-like structures 415, which are indicated by arrow 420, are neurites (i.e. axons and dendrites).

Figures 3A, 3B:
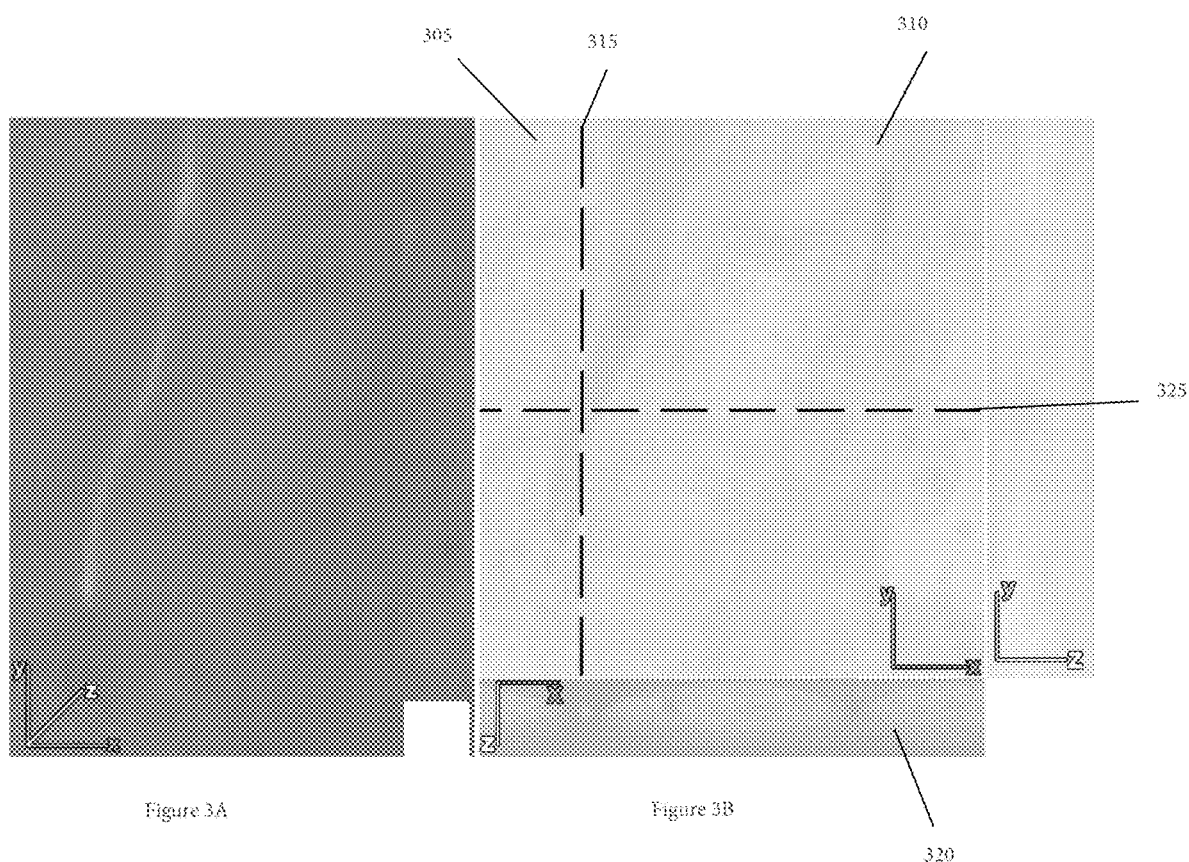
FIG. 3A is a volume rendering of an unprocessed WFM brain Image according to an exemplary embodiment of the present disclosure.
FIG. 3B is a 2D cross-sectional view of the volume from FIG. 3A in the x-y plane according to an exemplary embodiment of the present disclosure.

FIG. 3A is a volume rendering of an unprocessed WFM brain Image according to an exemplary embodiment of the present disclosure. FIG. 3B is a 2D cross-sectional view of the volume from FIG. 3A in the x-y plane according to an exemplary embodiment of the present disclosure. For example, area 305 of FIG. 3B shows a 2D cross-sectional view of the volume in the x-y plane. Area 310 shows a 2D cross-section in the y-z plane cut along the vertical dotted line 315. Area 320 shows a 2D cross-section in the x-z plane cut along the horizontal dotted line 325. The cross-sections show how out-of-focus light can occlude the low intensity features, making it difficult to analyze structures in 3D.

Due to limitations on preparation of specimens and the optical arrangement of a WF microscope, some neurites can have considerably low intensities. Within the scope of the domain, lower intensity structures cannot be deemed 'less significant', and the relationship between intensity and functioning strength of neuronal structures can be examined. For quantitative analysis, the exemplary system, method, and computer-accessible medium can consider all structures to be equally important. The microscopy data can be binarized, following thresholding. For example, a minimum value from the resulting pre-processing steps (diffusion, distance transform, followed by enhancement filter) can be interactively selected to threshold the background from the neuronal structures. Voxels having intensity values greater than and equal to the selected thresholded value can be masked as '1' while the voxels with values lower than the threshold value are masked as '0'.

The exemplary system, method, and computer-accessible medium can be used to examine the axons and dendrites rendered at a uniform intensity value with some visualization cues that can represent the intensity strength observed in the microscopy output.

The limitation of processing and visualization tools in handling large microscopy datasets can hinder the efficiency of neurobiologists' workflow to analyze experimental results. In contrast, the exemplary system, method, and computer-accessible medium can be deployed on commonly available desktop workstations.

Figure 5:
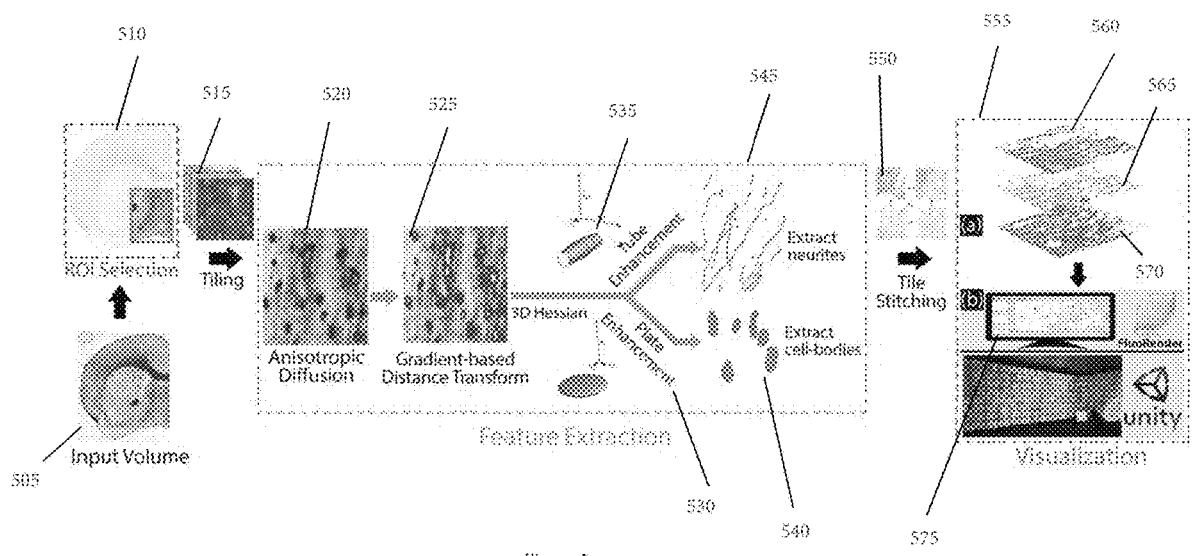
FIG. 5 is a diagram illustrating the workflow of the exemplary system, method, and computer-accessible medium according to an exemplary embodiment of the present disclosure.

The exemplary system, method, and computer-accessible medium can be used to address the out-of-focus blur in WFM brain images, making them more accessible to domain experts for visual and quantitative analysis. FIG. 5 illustrates an exemplary workflow for the present feature extraction and visualization pipeline. Following the region-of-interest ("ROI") selection by the users, the ROI can be divided into smaller tiles for parallelization of the feature extraction steps.

The user can first select a region of interest ("ROI") 510 from an input volume 505, which can then be tiled 515 for effective memory management during the feature extraction stage. Anisotropic diffusion 520 can be applied to tiling 515, which can be followed by the application of the gradient-based distance transform at procedure 525. A 3D Hessian procedure can be performed after the gradient-based distance transform 525, along with plate enhancement 530 and tube enhancement 535. For example, a 3D Hessian matrix can be calculated around each voxel. The enhancement filter can then take the Hessian matrix as its input and preserve voxels that have Eigen values $\lambda_a$ close to 0 and $\lambda_2$ and $\lambda_1$ as large negative values. $|\lambda_1|<|\lambda_2|<|\lambda_3|$. The filter can take into account that the Eigen values play a role in discriminating the shape and orientation of structures. In this regard, bright tubular structures will have low $\lambda_1$ and large negative values of $\lambda_2$ and $\lambda_3$. Bright plate like structures can be characterized with low values of $\lambda_1$ and $\lambda_2$ and large negative values of $\lambda_3$.

The output tiles from the gradient-based distance transform 525 can be processed to extract cell bodies 540 and neurites 545. Tile stitching 550 can be performed, and the output can facilitate three visualization modes 555 (i.e. bounded view 560, structural view 565, and classification view 570. Two display paradigms can be provided for the visualization of these modes, as illustrated by element 575. FluoRender can be used as the volume rendering engine for visualization on a personal desktop computer, and a Unity 3D tool can be used for the interactive exploration of these modes on the Reality Deck, which is an immersive gigapixel facility.

Feature Extraction

Given the challenges of WFM data, fine structural details can be swamped or obscured by out-of-focus light voxels and thus visualized with reduced contrast. The exemplary system, method, and computer-accessible medium can utilize a gradient-based distance transform function, which can be based on the fast marching framework (see, e.g., Reference 44), to capture of neuronal features in WFM brain data. Current distance transform functions can be introduced for the skeletonization of neurites in confocal and multi-photon microscopy datasets. When applied to WFM data, the computed distance transform blends neurites that run close to each other, and fails to isolate structures that have low contrast with the background. (See e.g., FIG. 6B). The gradient-based distance transform function can be used to suppress background voxels and grow regions of increasing intensity from the boundary of the neuronal structures to their center. The thresholded response from this distance function can be used as a bounding mask to isolate in-focus features in the volume. For example, a minimum value can be interactively selected from the resulting pre-processing steps (e.g., diffusion, distance transform, followed by enhancement filtering) to threshold the background from the desired neuronal structures. During thresholding, all voxels with intensity values below the threshold are set to an intensity value of "0."

Fast Marching and Gray-Weighted Distance Transform

Fast marching ("FM") is a region growing procedure that can model a volume as a voxel-graph and can recursively march the graph from a set of seed points to all the remaining voxels, in a distance increasing order. The voxels can be divided into three groups: alive, trial, and far. In the initialization step of the framework, voxels with intensity values corresponding to the 'background' can be initialized as seed points and can be labeled alive, the neighbors of the seed points can be labeled trial, and the remaining voxels can be labeled far. In each iteration, a trial voxel x, with the minimum distance to the set of alive voxels, can be extracted and changed from trial to alive. For an iteration n+1, the distance d of each non-alive neighbor y of x can be updated to the following.

$$d(y)_{n+1} = \min\{d(y)_n, d(x)_n + e(x,y)\} \quad (1)$$

where $d(y)_n$ can be the current distance value of voxel y, and $e(x,y)$ can be a distance function that determines the distance value between voxels x and y. Conventionally, distance functions were only applicable to thresholded binary values. APP2 (see, e.g., Reference 56), a neuron tracing procedure, defined a new distance function for grayscale intensities:

$$e(x,y) = \|x-y\| \cdot I(y) \quad (2)$$

where $\|x-y\|$ can be the Euclidean distance between two neighboring voxels x and y, and I(y) can be the intensity of voxel y in the raw data. The scalar multiplication between the distance and its intensity in Eq. (2) results in the FM procedure outputting increasing distance values towards the center of neuronal structures.

Gradient-Based Distance Transform

In WFM images, the intensity of light emitted by biological targets can decay with the square of the distance from the focal point in an airy pattern. (See, e.g., Reference 16). A gradient-based distance transform function that can be modeled on the emission of light in the sample, can be used, which can penalize voxels contributing to the out-of-focus blur, and can effectively recovers neurites with weak intensities.

To automatically select an intensity value for initializing the set of background voxels as seed points, a computed minimum intensity value that can work effectively with the exemplary system, method, and computer-accessible medium can be determined. The minimum intensity for each z-slice can be calculated from the input volume and the distance transform value $\phi(x)$ for each voxel x in the slice, can be initialized as, for example:

$$\phi(x) = \begin{cases} 0, \text{ alive} & x \in \text{background} \\ \infty, \text{ far} & x \notin \text{background} \end{cases} \quad (3)$$

The choice of this minimum value can be because in WFM data, z-slices away from the focal plane have decreasing intensities and reduced sharpness. Therefore, neurites away from the focal plane can have intensity values smaller than the intensity values of light-blur closer to the focal plane. Thus, to avoid weak intensity neurites being included as seed points, a minimum can be calculated for each z-slice.

The neighbors of all the background voxels can be set as trial, their distance value ($\phi$) initialized as the intensity (I) of the voxel in the raw data, and pushed into a priority queue. The trial voxel x with the minimum $\phi$ value can be extracted from the queue and its label can be changed to alive. For each non-alive neighboring voxel y of x, $\phi(y)$ can be updated as follows:

$$\phi(y)_{n+1} = \begin{cases} \min\{\phi(y)_n, \phi(x) \cdot \|x-y\| + \Delta G \cdot I(y)\} & |x_z - y_z\| > 0 \\ \min\{\phi(y)_n, \phi(x) \cdot \sqrt{\|x-y\|} + \Delta G \cdot I(y)\} & |x_z - y_z\| = 0 \end{cases} \quad (4)$$

where $\Delta G = \|G(x) - G(y)\|$ can be the magnitude difference between the anisotropic diffusion values at x and y, $|x_z - y_z|$ can be the z distance of the voxels. If y can be afar voxel, the label can be changed to trial and pushed into the priority queue. The trial voxels can be iteratively extracted until the priority queue can be empty.

The exemplary distance-transform function shown in Eq. (4) can be used to identify the 'neuriteness' of each voxel. Therefore, two new variations can be introduced to the gray-weighted distance transform in Eq. (2). First, the propagation of the distance transform value with respect to the z distance, attributing to the spreading of light from the targets in an airy pattern. Second, the addition of the term $\Delta G$. It was observed that regions of out-of-focus light have relatively uniform intensities and the edge-enhancing property of anisotropic diffusion can result in a gradient around the neuronal structures. Therefore, the difference was included in the anisotropic diffusion values between x and y as a weight in Eq. (2). As a result, the out-of-focus blur regions have $\phi$ values close to 0. FIG. 6A-6D show how the variations introduced in Eq. (4) improve the extraction of neurites.

For example, FIG. 6A shows the raw WFM brain volume. FIG. 6B is an image showing an application of the gradient-based distance transform (i.e. the application of the distance transform function shown in Eq. (2). This distance function can cause false branching between the neurites, because of the spreading of out-of-focus light, and may not be to recover neurites with lower intensities. FIG. 6C is an image illustrating improvements in neurite extraction based on an anisotropic diffusion term, which is illustrated in Eq. (4). Arrows 605 compare the incorrect branching of features in FIG. 6B. FIG. 6D is an image illustrating improvements due to the introduction of a z distance condition, which is shown in Eq. (4). Arrows 610 compare how some neurites, incomplete or missing in FIG. 6B are recovered in FIG. 6D.

The properties that differentiate the neuronal structures from the out-of-focus light can be similar to the three criteria motivating the previously-proposed anisotropic diffusion (see, e.g., Reference 33): (i) any feature at a coarse level of resolution can be required to possess a scale-space at a finer level of resolution and no spurious detail should be generated passing from finer to coarser scales; (ii) the region boundaries should be sharp and coincide with the semantically meaningful boundaries at that resolution; and (ii) at all scales, intra-region smoothing should occur preferentially over inter-region smoothing. Using the exemplary system, method, and computer-accessible medium, the anisotropic diffusion G, of the raw volume, can be calculated as a pre-processing procedure. Thus, for example:

$$G = \text{div}(D(|\Delta u|^2) \cdot \Delta u)$$

with the diffusiveness function, $$D(|\Delta u|^2) = \frac{1}{1 + (|\Delta u|/\lambda)^2}$$

Here, $\Delta u$ can be the convolution of the 3D volume with a gradient kernel, and $\lambda$ can be a contrast parameter. $\lambda$ can enforce smoothing in regions of out-of-focus light that inherently have low contrast and enhancement at the boundaries of neuronal structures that inherently have high contrast. $\Delta u$ can be set to be a 3D convolution mask of 26 neighboring voxels that can compute finite differences between the voxel intensity values. For $\lambda$, the intensity histograms of the neurites and out-of-focus light voxels were examined, and its value, for the WFM datasets, was determined to be 50 for an intensity range of 0-255.

Extraction of Neurites

From the generated 3D data of intensity values, the vesselness feature of the neurites were used to extract their geometric structure. The 3D multi-scale filter was used for curvilinear structures (see, e.g., Reference 41) to extract tubular structures from $\phi$. The response from this filter can be used to bind the voxels in the raw microscopy volume and thus used as an opacity map. This thresholding results in the removal of the background out-of-focus blur in the visualizations described herein.

Extraction of Cell-Bodies

The eigenvalues ($\lambda_1, \lambda_2, \lambda_3$) of the Hessian of a 3D image can indicate the local shape of an underlying object. A cell-body can be identified as an irregular-disk structure in a brain sample ('spots' 1125 shown in FIG. 11A). Substituting the geometric ratios introduced in Frangi's vesselness measure (see, e.g., Reference 10), an enhancement filter for a 2D plate-like structure can be defined as, for example:

$$O(\lambda) = \begin{cases} e^{-\frac{R_B^2}{2\beta^2}} \cdot \left(1 - e^{-\frac{s^2}{2\gamma^2}}\right) & \lambda_j < 0 \\ 0 & \text{otherwise} \end{cases}$$

where $s^2$ can be the Frobenius norm of the Hessian matrix and $R_B$ can be expressed as $$R_B = \frac{|\lambda_2|}{|\lambda_3|}.$$

A 2D plate enhancement filter was applied on each z-slice of the image stack, instead of applying a 3D 'blob' filter on the volume, because the poor axial resolution of a WF microscope can diminish the ellipsoidal attribute of the cell-body. Simply applying a blob filter may only extract the centroid of the cell-body. To properly bind the cell-body, the response of the 2D filter from each z-slice can then be diffused in the z direction using a Gaussian blur to form a 3D bounding structure. This bounding structure can then be used to extract the cell-bodies from the raw data.

Feature Visualization

Improved visualization of the neuronal structures, and binary visualization of neurites can be employed, and three visualization modes can be generated: (i) bounded view, (ii) structural view, and (ii) classification view. FluoRender was used as the volume rendering engine for the qualitative visualization of the outputs on a desktop computer. The choice can be attributed to FluoRender's ability to handle large microscopy data, multi-modal rendering of different volume groups, and its simple and interactive parameter settings.

Figure 7A:
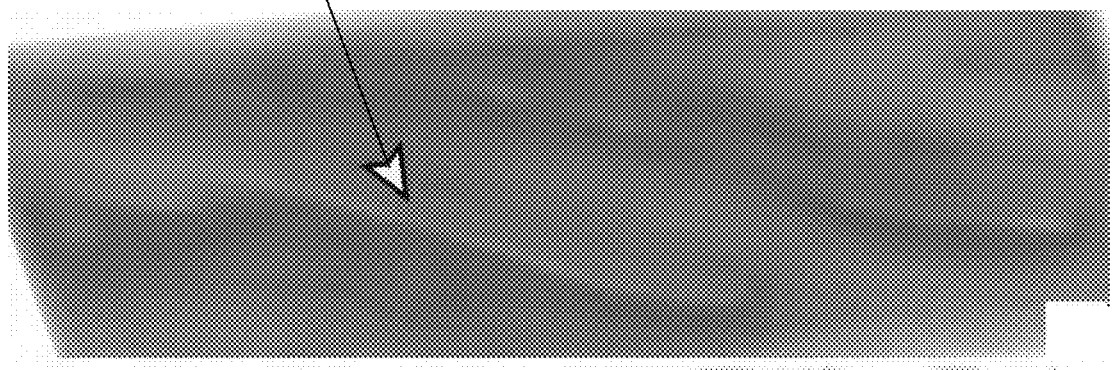
FIG. 7A is a volume rendering of raw wide-field microscopy data according to an exemplary embodiment of the present disclosure.
Figure 7B:
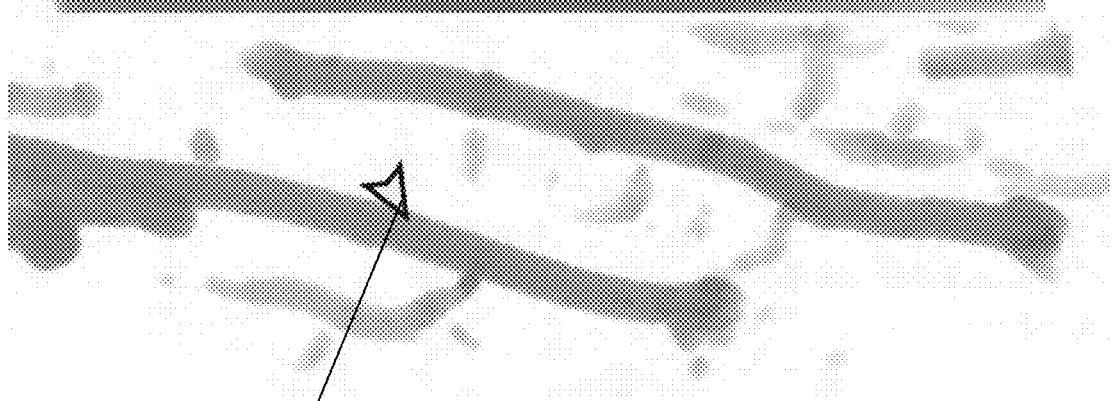
FIG. 7B is an image illustrating a bounded view that eliminates out-of-focus light according to an exemplary embodiment of the present disclosure.

Bounded view. An opacity map was used to separate features from out-of-focus blur and background noise, as shown in FIGS. 7A and 7B. In particular, FIG. 7A is a volume rendering of raw wide-field microscopy data and FIG. 7B is an image illustrating a bounded view that eliminates out-of-focus light. Arrows 705 indicate neurites. Once the response from the filter is thresholded and binarized, this response can be used as a mask for the opacity map. This opacity map effectively blocks voxels that are outside the mask and renders the original voxel intensity values that are inside the map. Users can interactively increase or decrease the radius of the opacity map. This use of the opacity map enables the domain experts to adjust the gamma, luminance, and other visualization parameters, for their analysis and investigation, without the amplification of noise voxels that obstruct the foreground voxels. The opacity map can be computed from the feature extraction pipeline and can form a conservative bound around the neuronal structures. This can facilitate domain experts to investigate their data without having to threshold and adjust parameters to remove the out-of-focus blur. Transfer functions and visualization parameters can now be effectively used to adjust the rendering of neuronal structures in the data.

Figures 8A, 8B:
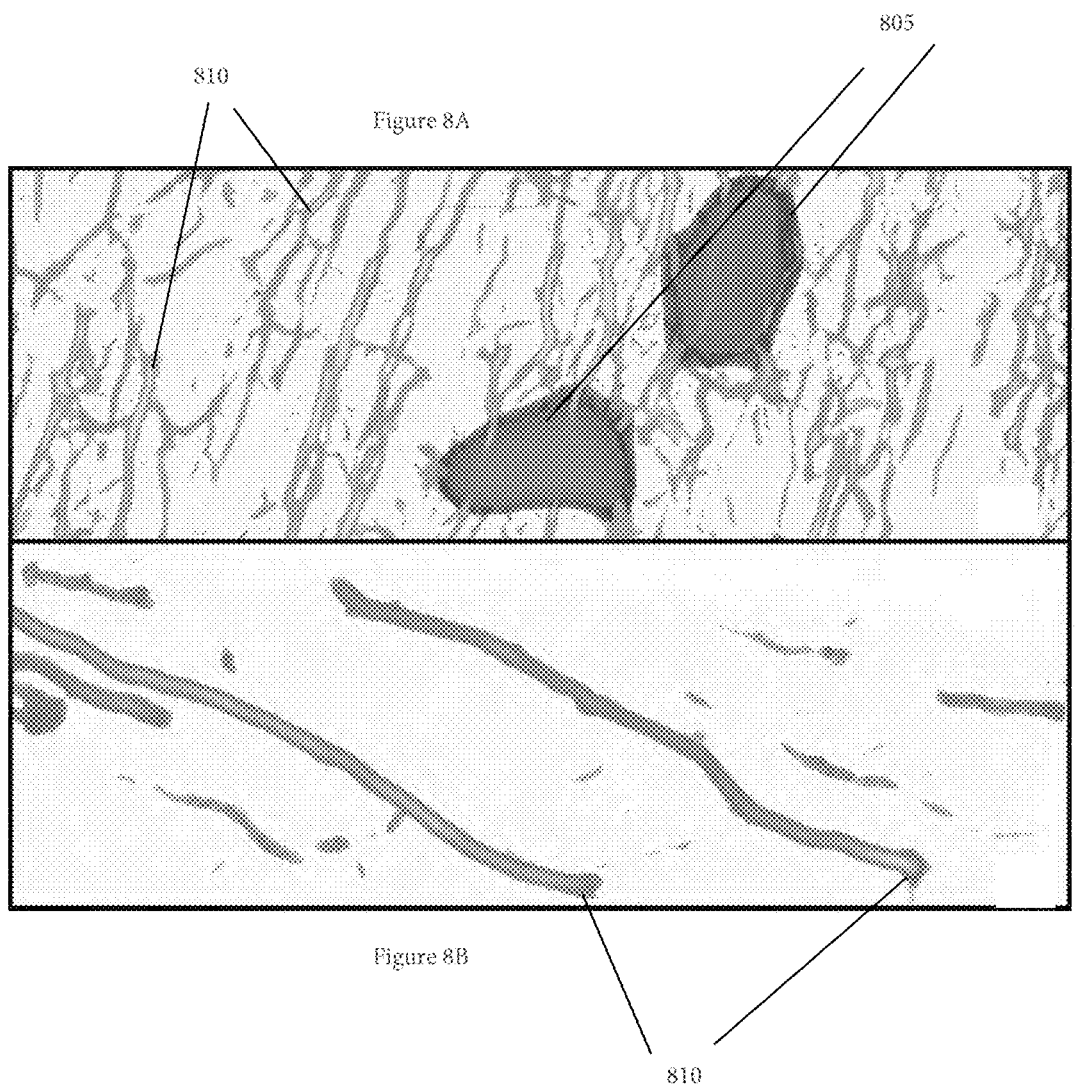
FIG. 8A is a rendering of the extracted geometry of neurites and cell bodies according to an exemplary embodiment of the present disclosure.
FIG. 8B is an image illustrating a structural view of the neurites shown in FIG. 7B according to an exemplary embodiment of the present disclosure.

Structural view. 3D analysis of neurites can be difficult in regions of dense neuronal networks, since the structures in raw WFM may not be continuous. To this end, a volume was generated from the responses of the curvilinear and cell-body extraction filters. For this visualization, two layers were used: (i) the neurite layer and (ii) the extracted cell-bodies layer. FIGS. 8A and 8B show an example of the structural view. In particular, FIG. 8A is a rendering of the extracted geometry of neurites and cell bodies and FIG. 8B is an image illustrating a structural view of the neurites shown in FIG. 7B. Structures 805 shown in FIG. 8A are the cell-bodies and the vessel-like structures 810 are the neurites.

Figure 9:
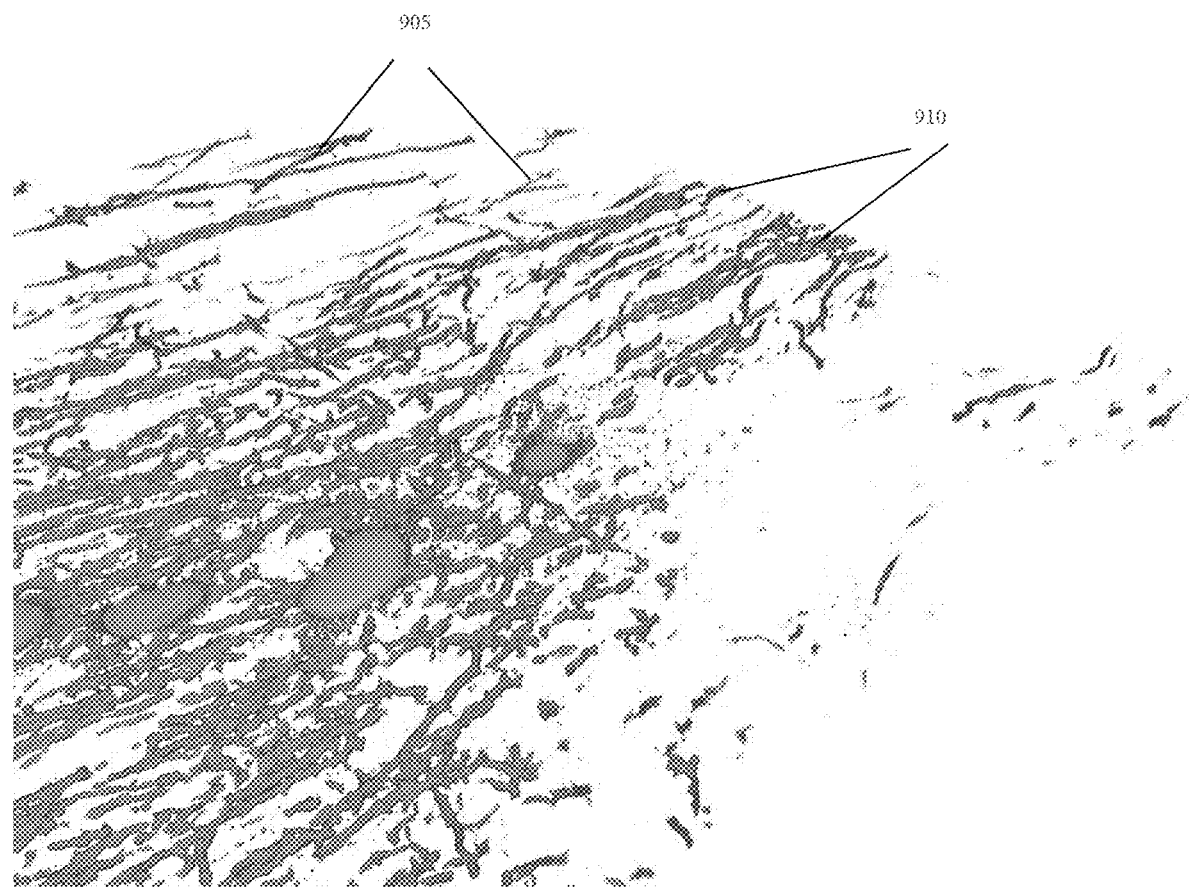
FIG. 9 is an image illustrating a classification view of neurites bases on feature intensity according to an exemplary embodiment of the present disclosure.

Classification view. Neurites can have variable intensity in WFM images due to various reasons, such as the structure moving in and out of the sample and due to experimental limitations in the image acquisition process. However, weak intensity neurites can still be relevant for domain analysis. Since the bounded and structural views can be visualizations of the raw WFM data, additional views can be included that can facilitate the analysis of all the neuronal structures in the sample, at a uniform intensity, but with a cue that can represent the strength of the structures observed in the raw data. These structures can be distinguishable by classifying the extracted neurites based on average intensities from the raw images. Such a classification allows the rendering of the weak and strong structures with different colors rather than using variable opacity, which can make them less visible. FIG. 9 shows an example of the classification view of neurites based on feature intensity. Areas 905 indicate weak intensity neurites while areas 910 indicate stronger intensity neurites. This classification can aid in locating neurites that may be fragmented or moving across different specimen slices.

The neurites can be classified into weak and strong based on their signal strength in the original images. This classification can be facilitated in the following manner. First, the extracted structure of neurites can be thresholded and binarized from the pipeline to remove noisy fragments and artifacts. Second, the Gaussian-weighted average intensity can be computed for every voxel in the original raw image using a standard deviation of 10× the voxel width. Finally, voxels of the binary mask computed in the first step can be classified based on the weighted averages computed in the second step. An adjustable diverging transfer function (see, e.g., Reference 25) with uniform opacity can be used to visualize this classification as shown in FIG. 9. As shown in FIG. 9, areas 905 indicate weak intensity neurites while areas 910 indicate stronger intensity neurites. This classification helps in locating neurites that may be fragmented or moving across different specimen slices.

GigaPixel Visualization

Figure 10:
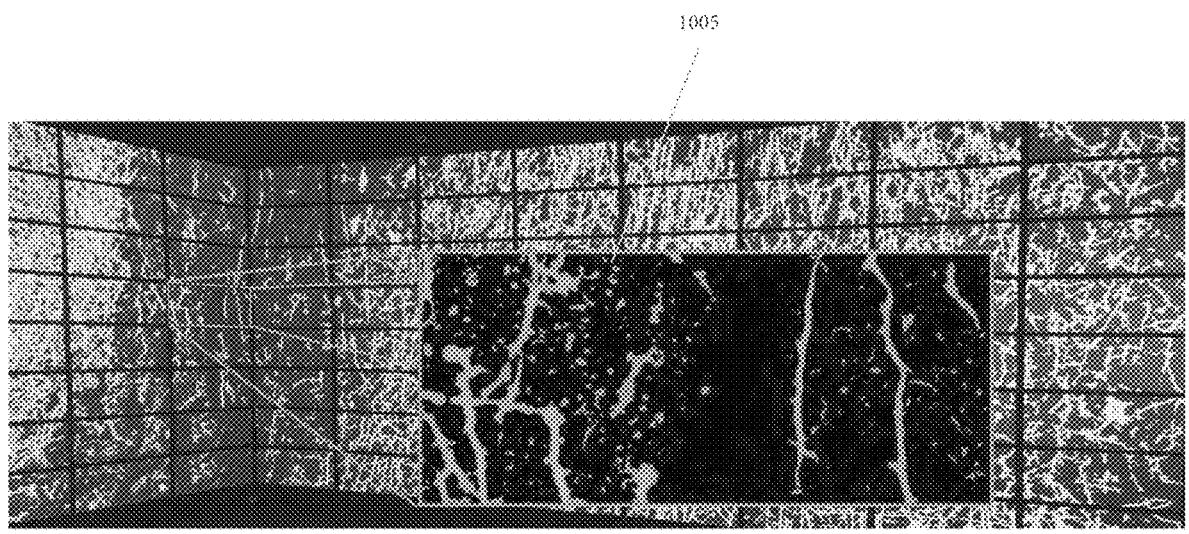
FIG. 10 is an image of a mouse brain specimen illustrating a structural view according to an exemplary embodiment of the present disclosure.

The exploration of WFM brain data can be extended to a visualization paradigm that can be instrumental for future research in neurobiology. An immersive gigapixel facility was used as a cluster for the processing and visualization of massive, high-resolution, microscopy data. The facility (e.g., referred to as a Reality Deck) can provide more than 1.5 gigapixels of resolution with a 360° horizontal field-of-view. In one embodiment, the Reality Deck includes 40'×30'×11' interior walls with 416 Samsung LCD displays running at 2560×1440 and powered by an 18-node graphics computing cluster, each with dual hex-core Intel Xeon CPUs, 4 AMD Firepro V9800 GPUs (each driving six monitors, for a total of 24 monitors and 90 MP of visual data per node), 48 GB of RAM and 1 TB of local storage. Given the complex nano-scale structure of the neuronal network of a brain, neurobiologists can be provided with the ability to interactively analyze their data and improve their visual acuity on the display platform. For example, FIG. 10 shows an exploration of the structural view of a mouse brain specimen (designated as specimen A-7) from the exemplary system, method, and computer-accessible medium on the Reality Deck. The inset tile 1005 shows the amount of detail that is visible by physically approaching the display walls. A substantial advantage to use of an immersive high resolution viewing platform, such as the Reality Deck, is that users can simultaneously view both image detail for a region of interest as well as substantial context information for that region of interest.

The exemplary system, method, and computer-accessible medium can render the three data views on the Reality Deck. Users can mark their ROI using a desktop computer placed inside the facility. The data can then be processed using the exemplary system, method, and computer-accessible medium and rendered on the display walls. Interaction can be driven by two components: (i) using a game controller to globally rotate and translate the data; and (ii) by physically approaching the display surfaces and naturally performing multiscale exploration. Additionally, by deploying the visualizations on the Reality Deck, neurobiologists can be facilitated to collaboratively explore their large experimental data. Furthermore, this visualization cluster serves as a computational resource for the processing pipeline, an efficient pipeline to handle large datasets.

TABLE 1

Datasets used in the evaluation of the workflow. A-20wf (medial septum dataset of a mouse brain imaged using a wide field) and A-20c (same specimen as A-20wf but imaged with a confocal microscope) can be WF and confocal images of the same specimen, respectively. A-7 tile can be a smaller region extracted from A-7.

| Dataset | Dimensions | Microscopy | Uncompressed size (GB) |
|---------|-----------|------------|------------------------|
| A-20wf  | 3000 × 6500 × 20 | WF | 0.85 |
| A-20c   | 3000 × 6500 × 20 | Confocal | 1.05 |
| A-7     | 11000 × 12400 × 20 | WF | 3.10 |
| A-7tile | 2750 × 3100 × 20 | WF | 0.22 |

WF microscopes with a lateral resolution of 160 nanometers can image a brain slice with dimensions 4 mm×5 mm×0.00084 mm that results in an image stack of approximately 10 gigabytes. Processing these large images on a regular basis can pose an additional challenge to domain experts. FIG. 5 shows an exemplary workflow for implementing the exemplary system, method, and computer-accessible medium. The input format can be TIFF, which can be commonly used in neurobiology research and is a standard image format used by microscopy manufacturer software. It will be appreciated, however, that other image input formats could also be employed. First, $M_{ATLAB}$ was used to load the microscopy volume, as input from the user, and display a lower resolution 2D maximum-intensity projection for the user to efficiently select an ROI. Since diffusion-based procedures can include local and identical computations over the entire image lattice, the ROI can then be divided into smaller tiles for better memory management during the feature extraction stage.

For each tile, in parallel, the anisotropic diffusion volume can then be generated. Next, the anisotropic diffusion volumes and raw tiles can be set as input to the gradient-based distance function, implemented in C++. The priority queue was implemented as a Fibonacci heap to efficiently obtain the minimum trial voxel in each iteration. For extracting the 3D neuronal features from the output of the gradient-based distance function, ITK's Hessian computation functionality, and the multi-scale vesselness filter was used. (See, e.g., Reference 42). Based on the anatomical radii of the neurites and cell-bodies, provided by neurobiologists, a a value of 1.0 to 2.0 was used for the Hessian matrix computation of the neurites, and a a value of 5.0 for the cell-bodies. After generating the output data from the filter responses for the three visualization modes, the processed tiles were automatically stitched together to create the full ROI volumes as a final output for the user.

FluoRender's rendering engine can be used for the visualization of the modes. The interactive tool for the visualization of the output views on the RD can be implemented in Unity3D. (See, e.g., Reference 50). UniCAVE (see, e.g., Reference 48), a Unity3D-based setup for virtual reality display systems can be used. The tool can be developed using C#and uses sparse textures to render the large microscopy volumes.

Results and Evaluation

Below is a qualitative evaluation of the output volume and visualizations generated using the presently described workflow as compared to Richardson-Lucy ("RL") deconvolution results and confocal microscopy images of the same specimen. Also provided is a computational performance evaluation by comparing with the RL deconvolution procedure.

Data Preparation

The exemplary system, method, and computer-accessible medium was tested on WFM datasets of mouse brain slices, imaged by neurobiologists. The WF microscope used was an Olympus VS-120, and the imaging parameters were set to a numerical aperture of 0.95 at 40× magnification, with xy resolution of 162.59 nm/pixel and z spacing of 0.84 µm. The results shown are artificial chromosomes-transgenic mice, expressing a tau-green fluorescent protein ("GFP") fusion protein under control of the ChAT promoter (e.g., ChAT tau-GFP). (See, e.g., Reference 12). Coronal brain sections of 30 µm thickness were cut with a cryostat. Serial sections were collected onto slides. Table 1 above provides details of the datasets used.

Evaluation

Qualitative comparison. The primary benchmark, for the qualitative evaluation of the results, can be to compare the volume generated by the exemplary system, method, and computer-accessible medium with raw data obtained using a confocal microscope. In terms of microscopy, the principle advantage of using a confocal microscope over a WF microscope can be its optical arrangement. A confocal microscope operates on the principle of a pinhole, which eliminates out-of-focus light, thus improving the fidelity of a 3D image and increasing the contrast of fine structural details. To evaluate the result, a mouse brain-slice was first imaged using WFM, and since a WF microscope does not completely bleach the biological sample, the slice was re-imaged using a confocal microscope. It took 10 minutes to image the slice using a WF microscope and approximately 2 hours for the same slice to be imaged using a confocal microscope.

Figures 11A, 11B, 11C:
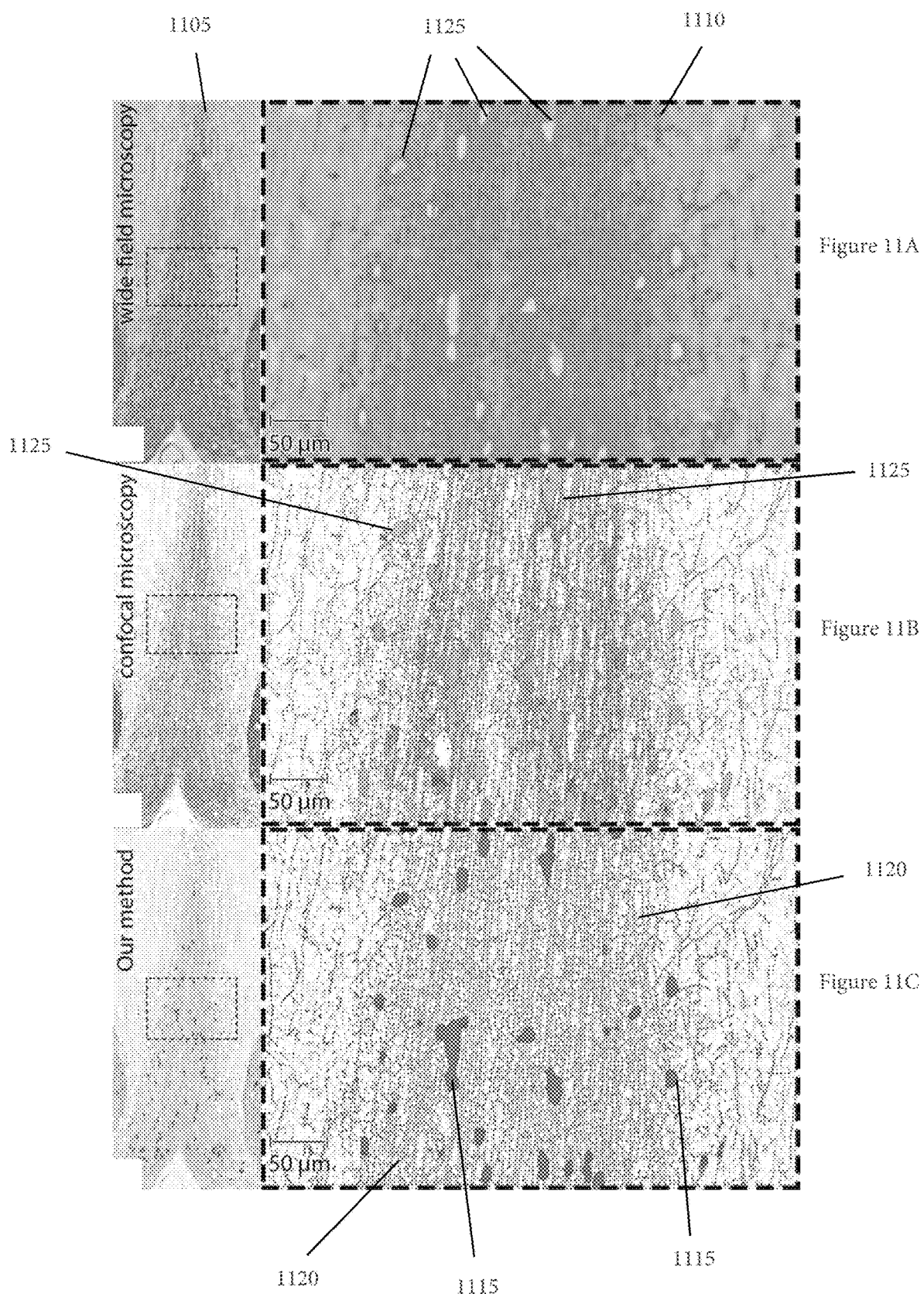
FIG. 11A is an image illustrating a volume rendering of a raw wide-field microscopy image according to an exemplary embodiment of the present disclosure.
FIG. 11B is an image illustrating a confocal microscopy image of the volume rendering shown in FIG. 11A according to an exemplary embodiment of the present disclosure.
FIG. 11C is an image illustrating a visualization of a 20wf generated using the exemplary system, method, and computer-accessible medium according to an exemplary embodiment of the present disclosure.

FIGS. 11A-11C show the volume rendering of the raw WF data (see e.g., FIG. 11A), the raw confocal data (see e.g., FIG. 11B), and the volume generated using the exemplary system, method, and computer-accessible medium for the A-20wf dataset (see e.g., FIG. 11C). Column 1105 shown in FIGS. 11A-11C are the zoomed out image of the ROI selected from the brain slice and column 1110 is 20× magnification into the dotted area of the region in the left column. The irregular plate-like structures 1125 shown in FIGS. 11A and 11B are the cell-bodies in the brain, and the remaining vessel-like structures are the neurites. In comparison to confocal microscopy, the neuronal structures in WF data are blurred due to out-of-focus light, making it difficult to study the geometry of the dendrites in 3D. The rendering of the result shown in FIG. 11C show that the exemplary system, method, and computer-accessible medium can eliminate the out-of-focus blur noise from WFM data and can successfully capture the neuronal structures in the slice. The irregular structures 1115 shown in FIG. 11C are the cell-bodies and structures 1120 are the dendrites. On comparing the result with confocal data, the visualizations from the pipeline are qualitatively similar to confocal microscopy data.

For the removal of out-of-focus blur from WFM data, an image restoration deconvolution procedure can also be used. RL can be a standard procedure readily available in deconvolution tools, such as DeconvolutionLab2 or MATLAB's deconvolution functions and can be widely-used by domain experts. Despite research, efforts in image processing, deconvolution can be a challenge because the PSF can be unknown. Even though blind deconvolution procedures can be proposed to eliminate the need of an accurate PSF, the efficacy of these procedures depends on an initial estimate. Since the pipeline can be designed based on the strength of visualization procedures, the exemplary system, method, and computer-accessible medium does not require any input microscopy parameters.

Figure 12:
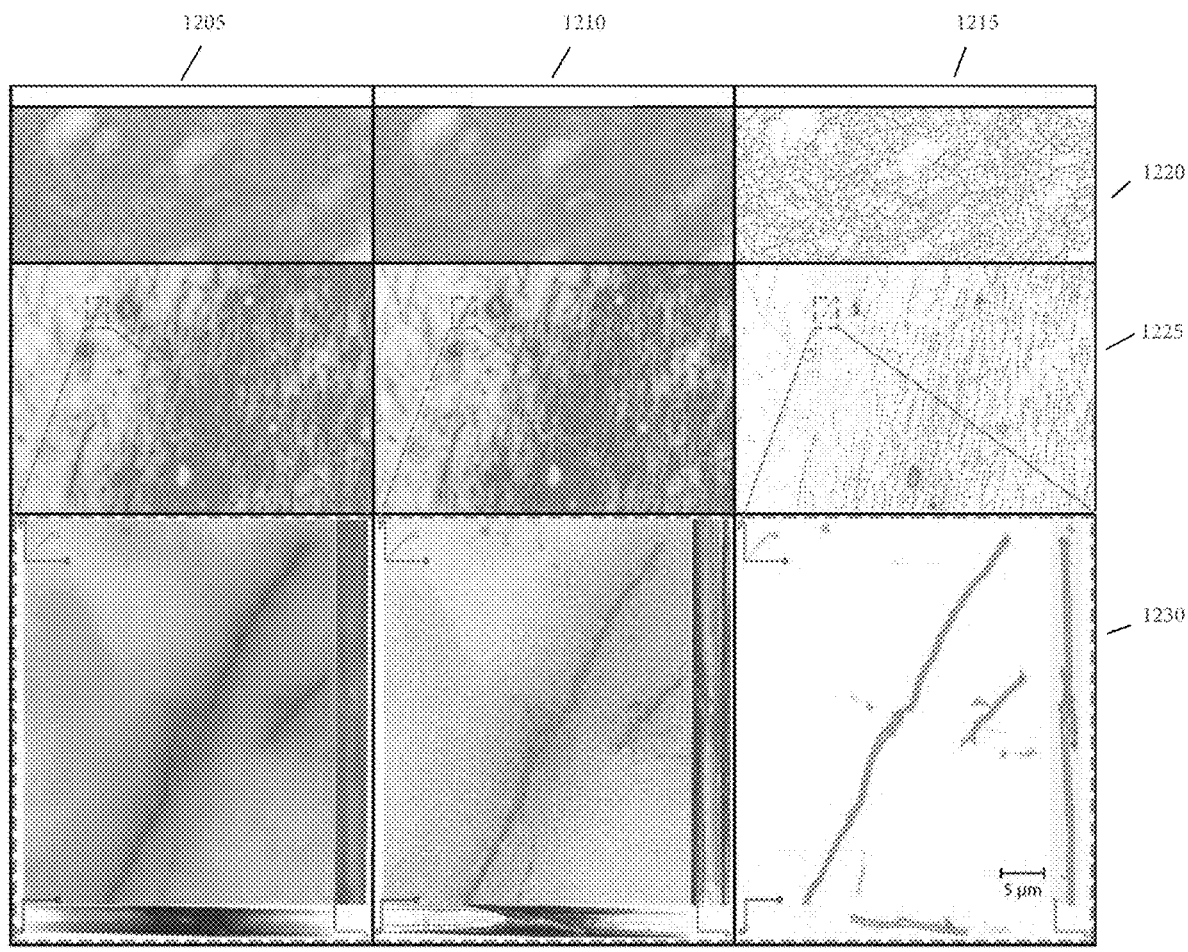
FIG. 12 is a set of volume renderings of comparing wide-field microscopy brain data, a Richard-Lucy deconvolution of the raw data, and the output using the exemplary system, method, and computer-accessible medium according to an exemplary embodiment of the present disclosure.

A qualitative comparison between Raw WFM Volume (column 1205), the RL procedure (column 1210) and the results generated using the exemplary system, method, and computer-accessible medium (column 1215) is shown in FIG. 12. Row 1220 shows an area of densely packed neuronal structures (e.g., in the striatum region of a mouse brain), row 1225 shows an area with axons, dendrites, and cell-bodies (e.g., in the medial septum region of a mouse brain), and row 1230 shows a 40× magnification into an area annotated in the medial septum. The volume renderings in each row are of the raw WFM data, the output from RL deconvolution, and the output from the exemplary system, method, and computer-accessible medium (e.g., columns 1205, 1210, and 1215, respectively). The parameters for the PSF estimation were obtained from the microscope settings (e.g., numerical aperture, objective magnification, charge-coupled device resolution, and z-spacing) and the slice preparation information (e.g., refractive index of the immersion medium, sample dimensions, and cover glass thickness). The PSF was calculated using Richards and Wolf (see, e.g., Reference 36), a shift invariant, vectorial-based diffraction PSF estimation model. The RL procedure was performed several times, changing the number of iterations for each attempt and found that the procedure-visually converges after 150 iterations based on visual comparison by the domain experts. Therefore, the images shown in column 1210 of FIG. 12 are the outputs from 150 iterations of the RL procedure. It can be observed from the different projections of the zoomed-in dendrite, in row 1230 of FIG. 12, that even though deconvolution removes most of the surrounding out-of-focus blur, and improves the contrast between background and foreground structures, the area around the dendrite can still be cluttered with noise. The result from the exemplary system, method, and computer-accessible medium (e.g., shown in column 1215) allows the user to directly visualize the dendrite structures, without having to adjust for the out-of-focus light obstruction.

Quantitative comparison. Cell-body count and terminal field density can be two commonly used measures for the quantification of experimental findings in neurobiology. The number of cell-bodies in a brain sample can signify the health of the brain and the network of axons neurites manifests the communication in the brain. In order to compute cell-body count and terminal density, the images can be first maximum intensity projected along the z-axis. The images can be converted to grayscale, and a threshold can be set to determine what gray value can be considered signal and what can be considered background. Images can be binarized after thresholding. For cell-body counts, diameter criteria can be set and counted using a cell counter plugin in ImageJ, which can record a total count and tags each included cell-body to ensure no cell can be counted twice. Terminal density can be computed as a ratio of white (e.g., signal) pixels to black (e.g., background) pixels.

TABLE 2

Comparison of quantitative measurements performed on the A-20wf WF, A-20wf with the RL-deconvolution, A-20wf with the exemplary system, method, and computer-accessible medium, and A-20c confocal data. The output of the exemplary system, method, and computer-accessible medium produces measurements that can be closer to the confocal benchmark Image (A-20c).

| Calculation | Raw WFM | RL | The exemplary system, method, and computer-accessible medium | Confocal Microscopy |
|---|---|---|---|---|
| Cell-body Count | 91 | 101 | 128 | 127 |
| Terminal Field Density | 16% | 22% | 35% | 39% |

The results in Table 2 reflect that, compared to the quantitative measurements calculated using confocal imaging, much of the neuronal information in WFM can be lost. This can be due to thresholding of the WFM data, in order to remove the out-of-focus blur pixels from the calculations. Even though the result from deconvolution improves the quantifications, some useful pixels can still be thresholded in the process of removing residual noise. In contrast, the quantitative measurements of the output generated from the exemplary system, method, and computer-accessible medium have similar values to that of confocal imaging and no thresholding was required to remove noise from the result. Thus, the exemplary system, method, and computer-accessible medium can aid neurobiologists to not only achieve qualitative renderings, but also quantitative results similar to that of confocal microscopy.

TABLE 3

Performance comparison for datasets A-20wf and A-7 between RL deconvolution procedure and the exemplary system, method, and computer-accessible medium. A-20wf was evaluated on a desktop workstation and A-7 was evaluated on the RD.

| Dataset | Method | Peak Memory (GB) | Total Time (hours) | Process |
|---|---|---|---|---|
| A-20wf | Deconvolution | 52.6 | 23.6 | Serial |
|  | The exemplary system, method, and computer-accessible medium | 11.5 | 1.35 | Serial |
| A-7 | Deconvolution | 62 | 18.2 | Parallel |
|  | The exemplary system, method, and computer-accessible medium | 8.7 | 0.45 | Parallel |

Performance measure. The pipeline was tested on two systems, a desktop workstation, and the Reality Deck. The desktop workstation system was a Windows PC with Intel Xeon E5-2623 CPU, 64 GB RAM, and an NVIDIA GeForce GTX 1080 GPU. The Reality Deck was a visualization cluster with 18 nodes. Each node was equipped with dual hexacore Intel Xeon E5645 CPUs, 64 GB RAM, and four AMO FirePro V9800 GPUs. Dataset A-20wf was evaluated on the desktop system and A-7 was evaluated on the Reality Deck. Since deconvolution can be an alternative method for the restoration of WFM images, for improved qualitative and quantitative analysis of brain samples, the performance of the exemplary system, method, and computer-accessible medium was compared with the RL procedure. Deconvolution was carried out using DeconvolutionLab2 (see, e.g., Reference 38), an ImageJ plug-in. Table 3 reports the performance measurements for the two methods.

The peak memory, in Table 3, was the maximum amount of RAM needed at any stage of the process, and total time was the time elapsed from the start of the exemplary system, method, and computer-accessible medium until the final output results were generated. Dataset A-7 was divided into 16 tiles and each node of the Reality Deck processed two tiles. For both deconvolution and the exemplary system, method, and computer-accessible medium, 8 nodes of the Reality Deck were used for processing. The performance numbers show that the exemplary system, method, and computer-accessible medium is orders of hours faster, and more memory efficient than deconvolution. A domain expert would need a powerful, high performance computer to run the deconvolution process on their experimental data and it would make it even more challenging to process microscopy data in a large volume. In contrast, the exemplary system, method, and computer-accessible medium can be executed on a standard desktop machine and generates results in a much shorter amount of time.

Domain Expert Feedback

Figures 13A, 13B:
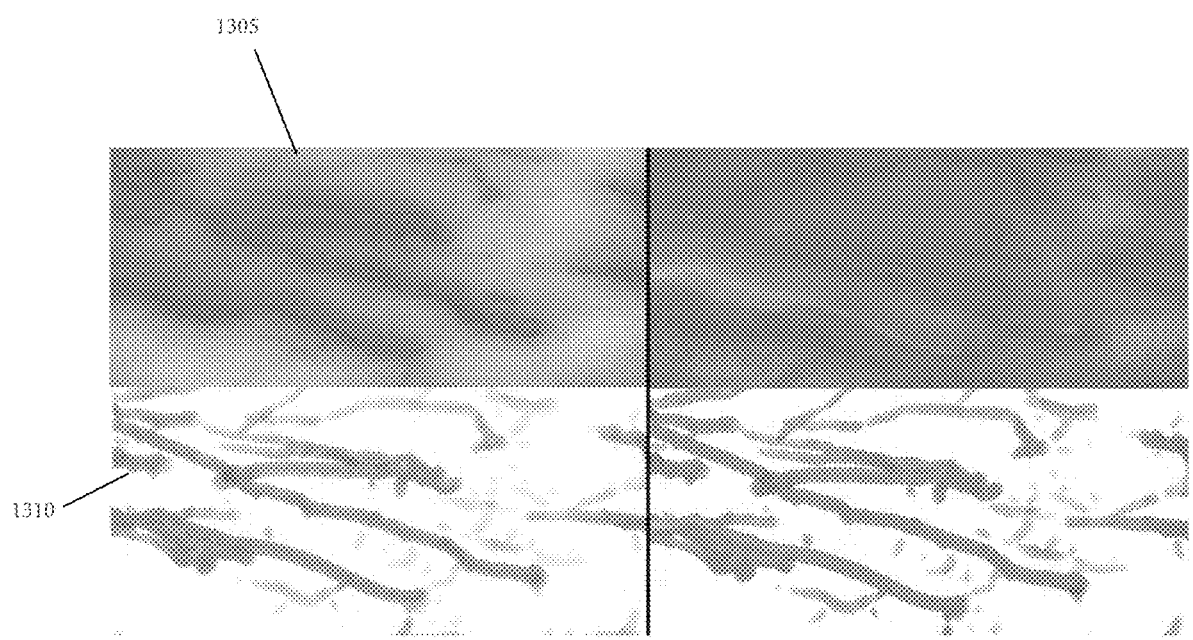
FIG. 13A is an image illustrating a rendering of the raw volume and a bounded view according to an exemplary embodiment of the present disclosure.
FIG. 13B is an image illustrating corresponding renderings from FIG. 13A when the gamma value is changed according to an exemplary embodiment of the present disclosure.

Bounded view. Using this view, a neurobiologists can could adjust the gamma and the luminance settings, provided in FluoRender, for a qualitative analysis, which otherwise would have been impossible due the obstructions caused by the amplified noise voxels. (See e.g., FIGS. 13A and 13B). For example, FIG. 13A is an image illustrating a rendering of the raw volume 1305 and a bounded view 1310 at a particular gamma value (e.g., a gamma value of 1) and FIG. 13B is an image illustrating corresponding renderings from FIG. 13A when the gamma value is changed to 2. Changing visualization parameters can make it difficult to study the features in the raw volume, due to the obstruction caused by noise, whereas for the bounded view, the parameters are only applied to the features bounded by the mask extracted using the exemplary system, method, and computer-accessible medium.

Structural view. This output can be particularly useful for quantitative analysis. The cell-bodies layer can provide a direct cell-body count, without having to perform thresholding to remove all other structures, and the neurite layer can be projected directly in 2D for the terminal field density calculation. Additionally, the structural view can be useful to shift between the structural and bounded visualization for a detailed analysis of their samples.

Classification view. In the examined ROI, the neurites often enter from, and exit to, the surrounding brain slices. The reason why some structures, or part thereof, have weaker intensities in the imaged data, can be because the majority of structural mass can be in neighboring slices. Analyzing the result of the classification view, facilitate the identification of the region of the neurite entering/exiting the focal plane.

GigaPixel Visualization. The Reality Deck can be used in understanding the disposition of complex terminal field networks and the functional mapping of individual cholinergic neurons. Typically, when visualizing a single region of the brain, scientists would have to zoom in to the ROI, and thus, lose the context of the entire brain slice. The panoramic projection of the data on the Reality Deck facilitates domain experts to determine details in the organization of structures from one brain region to another, which otherwise would not be at such high resolution, side by side. This also allows for mapping of structures within the field of view as structures can be followed across large distances, which would have been difficult or impossible on standard desktop screens.

The exemplary system, method, and computer-accessible medium can overcome the inherent out-of-focus blur caused in the WFM images through a gradient-based distance transform computation followed by extraction of 3D neuronal structures using 3D curvilinear and 2D plate enhancement filters. The exemplary system, method, and computer-accessible medium can provide three different visualization modes (e.g., (i) bounded view, (ii) structural view, and (iii) classification view) that can meet the domain goals. A combination of these views and the ability to switch between them can provide the ability to explore local features through visualization and compare them with the raw images without losing context. Moreover, the exemplary system, method, and computer-accessible medium can be used to separate cell-bodies from neurites to provide a clutter-free and effective visualization. It can also overcome the unnecessary pre-processing procedures that are otherwise required of WF images for quantitative analyses, such as cell-body counting and estimating neurite density.

The exemplary system, method, and computer-accessible medium can utilize sophisticated interaction techniques under immersive visualization platforms, such as gigapixel walls and head-mounted displays. Such immersive platforms can be leveraged for better exploration of large WFM images. Furthermore, GPU-based implementation of the feature extraction workflow can be used to accelerate the computation of the distance function and the Hessian matrix calculation for the feature extraction filters. This can facilitate users to interactively change the parameters of the neurite and cell-body extraction filters and observe their results reflected in the changing opacity maps.

Figure 14:
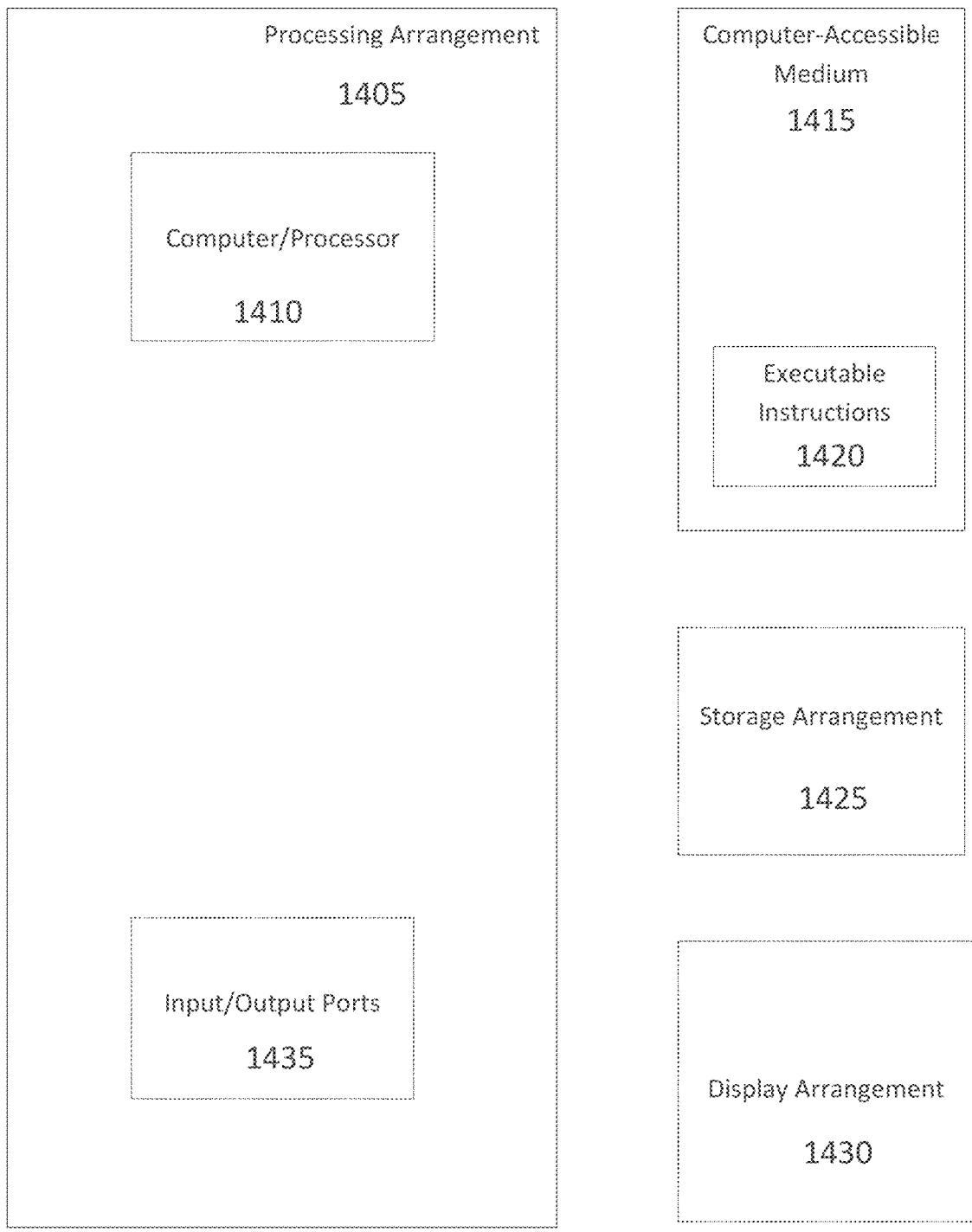
FIG. 14 is an illustration of an exemplary block diagram of an exemplary system in accordance with certain exemplary embodiments of the present disclosure.

FIG. 14 shows a block diagram of an exemplary embodiment of a system according to the present disclosure, which can be used to implement the exemplary system, method, and computer-accessible medium. For example, exemplary procedures in accordance with the present disclosure described herein (e.g., which can include applying a gradient-based distance transform function) can be performed by a processing arrangement and/or a computing arrangement (e.g., computer hardware arrangement) 1405. Such processing/computing arrangement 1405 can be, for example entirely or a part of, or include, but not limited to, a computer/processor 1410 that can include, for example one or more microprocessors, and use instructions stored on a computer-accessible medium (e.g., RAM, ROM, hard drive, or other storage device) for implementing the exemplary system, method, and computer-accessible medium.

As shown in FIG. 14, for example a computer-accessible medium 1415 (e.g., as described herein above, a storage device such as a hard disk, floppy disk, memory stick, CD-ROM, RAM, ROM, etc., or a collection thereof) can be provided (e.g., in communication with the processing arrangement 1405). The computer-accessible medium 1415 can contain executable instructions 1420 thereon, which can include applying a gradient-based distance transform function in order to visualize large, high-resolution, microscopy data. In addition or alternatively, a storage arrangement 1425 can be provided separately from the computer-accessible medium 1415, which can provide the instructions to the processing arrangement 1405 so as to configure the processing arrangement to execute certain exemplary procedures, processes, and methods, as described herein above.

Further, the exemplary processing arrangement 1405 can be provided with or include an input/output ports 1435, which can include, for example a wired network, a wireless network, the internet, an intranet, a data collection probe, a sensor, etc. As shown in FIG. 14, the exemplary processing arrangement 1405 can be in communication with an exemplary display arrangement 1430, which, according to certain exemplary embodiments of the present disclosure, can be a touch-screen configured for inputting information to the processing arrangement in addition to outputting information from the processing arrangement, for example. Further, the exemplary display arrangement 1430 and/or a storage arrangement 1425 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entireties.
[1] L. Acciai, P. Soda, and G. Iannello. Automated neuron tracing methods: an updated account. *Neuroinformatics*, 14(4):353-367, 2016.
[2] A. K. Al-Awami, J. Beyer, H. Strobelt, N. Kasthuri, J. W. Lichtman, H. Pfister, and M. Hadwiger. Neurolines: a subway map metaphor for visualizing nanoscale neuronal connectivity. *IEEE Transactions on Visualization and Computer Graphics*, 20(12):2369-2378, 2014.
[3] K. A., Al-Kofahi, S. Lasek, D. H. Szarowski, C. J. Pace, G. Nagy, J. N. Turner, and B. Roysam. Rapid automated three-dimensional tracing of neurons from confocal image stacks. *IEEE Transactions on Information Technology in Biomedicine*, 6(2):171-187, 2002.
[4] J. Beyer, A. Al-Awami, N. Kaslhuri, J. W. Lichlman, H. Pfister, and M. Hadwiger. ConnectomeExplorer: Query-guided visual analysis of large volumetric neuroscience data. *IEEE Transactions on Visualization and Computer Graphics*, 19(12):2868-2877, 2013.
[5] M. Born and E. Wolf. *Principles of optics: electromagnetic theory of propagation, interference and diffraction of light*. Elsevier, 2013.
[6] A. Bria, G. Iannello, and H. Peng. An open-source VAA3D plugin for real-time 3D visualization of terabyte-sized volumetric images. *IEEE Biomedical Imaging*, 2015.
[7] K. M. Brown, G. Barrionuevo, A. I. Canty, V. De Paola, J. A. Hirsch, G. S. Jefferis, J. Lu, M. Snippe, I. Sugihara, and G. A. Ascoli. The DIADEM data sets: representative light microscopy images of neuronal morphology to advance automation of digital reconstructions. *Neuroinformatics*, 9(2-3):143-157, 2011.

[8] P. Chothani, V. Mehta, and A. Stepanyants. Automated tracing of neurites from light microscopy stacks of images. *Neuroinformatics*, 9(2-3):263-278, 2011.

[9] J. C. Fiala. Reconstruct: a free editor for serial section microscopy. *Journal of Microscopy*, 218(1):52-61, 2005.

[10] A. F. Frangi, W. J. Niessen, K. L. Vincken, and M. A. Viergever. Multiscale vessel enhancement filtering. *International Conference on Medical Image Computing and Computer-Assisted Intervention*, pp. 130-137. 1998.

[11] S. F. Gibson and F. Lanni. Experimental test of an analytical model of aberration in an oil-immersion objective lens used in three-dimensional light microscopy. *JOSA A*, 9(1):154-166, 1992.

[12] M. J. Grybko, E.-t. Hahm, W. Perrine, J. A. Parnes, W. S. Chick, G. Shanna, T. E. Finger, and S. Vijayaraghavan. A transgenic mouse model reveals fast nicotinic transmission in hippocampal pyramidal neurons. *European Journal of Neuroscience*, 33(10):1786-1798, 2011.

[13] F. Janoos, B. Nouansengsy, X. Xu, R. Machiraju, and S. T. Wong. Classification and uncertainty visualization of dendritic spines from optical microscopy imaging, *Computer Graphics Forum*, 27(3):879-886, 2008.

[14] W.-K. Jeong, J. Beyer, M. Hadwiger, R. Blue, C. Law, A. Vazquez, C. Reid, J. Lichtman, and H. Pfister. SSECRETT and NeuroTrace: Interactive Visualization and Analysis Tools for Large-Scale Neuroscience Datasets. *IEEE Computer Graphics and Applications*, 30:58-70, May 2010 2010.

[15] R. Jianu, C. Demiralp, and D. H. Laidlaw. Exploring brain connectivity with two-dimensional neural maps. *IEEE Transactions on Visualization and Computer Graphics*, 18(6):978-987, 2012.

[16] M. Keuper, T. Schmidt, M. Temerinac-Ott, J. Padeken, P. Heun, O. Ronneberger, and T. Brox. Blind Deconvolution of Widefield Fluorescence Microscopic Data by Regularization of the Optical Transfer Function (OTF). pp. 2179-2186, June 2013. doi: 10.1109/CVPR.2013.283

[17] B. Laha, K. Sensharma, J. D. Schiffbauer, and D. A. Bowman. Effects of immersion on visual analysis of volume data. *IEEE Transactions on Visualization and Computer Graphics*, 18(4):597-606, 2012.

[18] G. Läthtén, S. Lindholm, R. Lenz, A. Persson, and M. Borga. Automatic tuning of spatially varying transfer functions for blood vessel visualization. *IEEE Transactions on Visualization and Computer Graphics*, 18(12): 2345-2354, 2012.

[19] A. Levin, Y. Weiss, F. Durand, and W. T. Freeman. Understanding blind deconvolution algorithms. *IEEE Transactions on Pattern Analysis and Machine Intelligence*, 33(12):2354-2367, 2011.

[20] S. Liu, D. Zhang, S. Liu, D. Feng, H. Peng, and W. Cai. Rivulet: 3d neuron morphology tracing with iterative back-tracking. *Neuroinformatics*, 14(4):387-401, 2016.

[21] L. B. Lucy. An iterative technique for the rectification of observed distributions. *The Astronomical Journal*, 79:745, 1974.

[22] MBF Bioscience. NeuroLucida360.

[23] T. McGraw. Graph-based visualization of neuronal connectivity using matrix block partitioning and edge bundling. pp. 3-13, 2015.

[24] E. Meijering, M. Jacob, J.-C. Sarria, P. Steiner, H. Hirling, and M. Unser. Design and validation of a tool for neurite tracing and analysis in fluorescence microscopy images. *Cytometry*, 58(2):167-176, 2004.

[25] K. Moreland. Diverging color maps for scientific visualization. *International Symposium on Visual Computing*, pp. 92-103, 2009.

[26] K. Mosaliganti, L. Cooper, R. Sharp, R. Machiraju, G. Leone, K. Huang, and J. Saltz. Reconstruction of cellular biological structures from optical microscopy data. *IEEE Transactions on Visualization and Computer Graphics*, 14(4):863-876, 2008.

[27] M. Nakao, K. Kurebayashi, T. Sugiura, T. Sato, K. Sawada, R. Kawakami, T. Nemoto, K. Minato, and T. Matsuda. Visualizing in vivo brain neural structures using volume rendered feature spaces. *Computers in biology and medicine*, 53:85-93, 2014.

[28] A. Narayanaswamy, Y. Wang, and B. Roysam. 3-D image pre-processing algorithms for improved automated tracing of neuronal arbors. *Neuroinformatics*, 9(2-3):219-231, 2011.

[29] National Institute of Health. BRAIN initiative. https://www.braininitiative.nih.gov, 2017.

[30] C. Papadopoulos, K. Petkov, A. E. Kaufman, and K. Mueller. The Reality Deck-an Immersive Gigapixel Display. *IEEE Computer Graphics and Applications*, 35(1): 33-45, 2015.

[31] H. Peng, M. Hawrylycz, J. Roskams, S. Hill, N. Spruston, E. Meijering, and G. A. Ascoli. BigNeuron: Large-Scale 3D Neuron Reconstruction from Optical Microscopy Images. *Neuron*, 87(2):252-256, 2015.

[32] H. Peng, Z. Ruan, F. Long, J. H. Simpson, and E. W. Myers. V3D enables real-time 3D visualization and quantitative analysis of large-scale biological image data sets. *Nature biotechnology*, 28(4):348, 2010.

[33] P. Perona and J. Malik. Scale-space and edge detection using anisotropic diffusion. *IEEE Transactions on Pattern Analysis and Machine Intelligence*, 12(7):629-639, 1990.

[34] H. Pfister, V. Kaynig, C. P. Botha, S. Bruckner, V. J. Dercksen, H.-C. Hege, and J. B. Roerdink. Visualization in connectomics. In *Scientific Visualization*, pp. 221-245. Springer, 2014

[35] Prabhat, A. Forsberg, M. Katzourin, K. Wharton, and M. Slater. A Comparative Study of Desktop, Fishtank, and Cave Systems for the Exploration of Volume Rendered Confocal Data Sets. *IEEE Transactions on Visualization and Computer Graphics*, 14(3):551-563, May 2008. doi: 10.1109/TVCG.2007.70433

[36] B. Richards and E. Wolf. Electromagnetic diffraction in optical systems, ii. structure of the image field in an aplanatic system. *The Royal Society*, 253(1274):358-379, 1959.

[37] W. H. Richardson. Bayesian-based iterative method of image restoration. *JOSA*, 62(1):55-59, 1972.

[38] D. Sage, L. Donati, F. Soulez, D. Fortun, G. Schmit, A. Seitz, R. Guiet, C. Vonesch, and M. Unser. Deconvolution Lab2: An open-source software for deconvolution microscopy. *Methods*, 115:28-41, 2017.

[39] A. Santamaria-Pang, P. Hernandez-Herrera, M. Papadakis, P. Saggau, and I. A. Kakadiaris. Automatic morphological reconstruction of neurons from multiphoton and confocal microscopy images using 3D tubular models. *Neuroinformatics*, 13(3):297-320, 2015.

[40] P. Sarder and A. Nehorai. Deconvolution methods for 3-D fluorescence microscopy images. *IEEE Signal Processing Magazine*, 23(3):32-45, 2006.

[41] Y. Sato, S. Nakajima, H. Atsumi, T. Koller, G. Gerig, S. Yoshida, and R. Kikinis. 3D multi-scale line filter for segmentation and visualization of curvilinear structures in medical images. In *CVRMed-MRCAS '97*, pp. 213-222. Springer, 1997.

[42] W. Schroeder, L. Ng, J. Cates, et al. The ITK software guide. *The Insight Consortium*, 2003.

[43] Scientific Volume Imaging. Recording beads to obtain an experimental PSF. https://svi.nl/RecordingBeads.

[44] J. A. Sethian. A fast marching level set method for monotonically advancing fronts. *Proceedings of the National Academy of Sciences*, 93(4):1591-1595, 1996.

[45] P. J. Shaw. Comparison of widefield/deconvolution and confocal microscopy for three-dimensional imaging. In *Handbook of biological confocal microscopy*, pp. 453-467. Springer, 2006.

[46] J. Sorger, K. Buhler, F. Schulze, T. Liu, and B. Dickson. neuroMAP interactive graph-visualization of the fruit fly's neural circuit. pp. 73-80, 2013.

[47] O. Sporns, G. Tononj, and R. Mitten The Human Connectome: A Structural Description of the Human Brain. *PLOS Computational Biology*, 1(4), September 2005. doi: 10.1371/journal.pcbi.0010042

[48] R. Tredinnick, B. Boettcher, S. Smith, S. Solovy, and K. Ponto. Uni-CAVE: A Unity3D plugin for non-head mounted VR display systems. *IEEE Virtual Reality (VR)*, pp. 393-394, 2017.

[49] E. Türetken, G. González, C. Blum, and P. Fua. Automated reconstruction of dendritic and axonal trees by global optimization with geometric priors. *Neuroinformatics*, 9(2-3):279-302, 2011.

[50] Unity Technologies. Unity3D. https://unity3d.com/unity/, 2017.

[51] W. Usher, P. Klacansky, F. Federer, P.-T. Bremer, A. Knoll, J. Yarch, A. Angelucci, and V. Pascucci. A virtual reality visualization tool for neuron tracing. *IEEE Transactions on Visualization and Computer Graphics*, 24(1): 994-1003, 2018.

[52] Y. Wan, H. Otsuna, C.-B. Chien, and C. Hansen. An Interactive Visualization Tool for Multi-channel Confocal Microscopy Data in Neurobiology Research. *IEEE Transactions on Visualization and Computer Graphics*, 15(6): 1489-1496, November 2009. doi: 10.1109/TVCG.2009.118

[53] Y. Wan, H. Otsuna, C.-B. Chien, and C. Hansen. FluoRender: an application of 2D image space methods for 3D and 4D confocal microscopy data visualization in neurobiology research. *IEEE Visualization Symposium (PacificVis)*, 2012.

[54] Y. Wang, A. Narayanaswamy, C.-L. Tsai, and B. Roysam. A broadly applicable 3-D neuron tracing method based on open-curve snake. *Neuroinformatics*, 9(2-3): 193-217, 2011.

[55] M. Wilson. Introduction to Widefield Microscopy. https://www.leica-microsystems.com/science-lab/introduction-to-widefield-microscopy/, 2017.

[56] H. Xiao and H. Peng. APP2: automatic tracing of 3D neuron morphology based on hierarchical pruning of a gray-weighted image distance-tree. *Bioinformatics*, 29(11):1448-1454, 2013.

[57] X. Yang, L. Shi, M. Daianu, H. Tong, Q. Liu, and P. Thompson. Blockwise human brain network visual comparison using nodetrix representation. *IEEE Transactions on Visualization and Computer Graphics*, 23(1):181-190, 2017.

[58] T. Zhao, J. Xie, F. Amat, N. Clack, P. Ahammad, H. Peng, F. Long, and E. Myers. Automated reconstruction of neuronal morphology based on local geometrical and global structural models. *Neuroinformatics*, 9(2-3):247-261, 2011.

What is claimed is:

1. A non-transitory computer-accessible medium having stored thereon computer-executable instructions for generating at least one image of at least one anatomical structure in at least one biological sample, wherein, when a computing arrangement executes the instructions, the computing arrangement is configured to perform procedures comprising:

receiving first wide field microscopy imaging information for the biological sample; generating second imaging information by applying a gradient-based distance transform to the first imaging information, wherein the gradient-based distance transform comprises:
determining a global minimum intensity value based on voxels in the first imaging information;
determining at least one seed voxel based on the global minimum intensity value;
determining an intensity value for neighboring voxels of the at least one seed voxel;
determining a particular neighbor voxel of the neighboring voxels that has a highest intensity; and
adding the intensity value for the at least one seed voxel to the particular neighbor voxel; and generating the at least one image based on the second imaging information.

2. The computer-accessible medium of claim 1, wherein the computer arrangement is further configured to generate the second imaging information by applying an anisotropic diffusion procedure to the first imaging information.

3. The computer-accessible medium of claim 1, wherein the computer arrangement is configured to generate the second imaging information by applying a curvilinear filter and a Hessian-based enhancement filter after the application of the gradient-based distance transform.

4. The computer-accessible medium of claim 3, wherein the computer arrangement is configured to generate the second information by applying at least one of (i) a tube enhancement procedure or (ii) a plate enhancement procedure after the application of the gradient-based distance transform.

5. The computer-accessible medium of claim 4, wherein the computer arrangement is further configured to:
extract tubular structures in the first imaging information using the tube enhancement procedure; and
extract cell bodies in the first imaging information using the plate enhancement procedure.

6. The computer-accessible medium of claim 1, wherein the second imaging information is an opacity map.

7. The computer-accessible medium of claim 6, wherein the gradient-based distance transform includes determining the global minimum intensity value for each z-slice in the first imaging information.

8. The computer-accessible medium of claim 1, wherein the computer arrangement is further configured to:
split the wide field microscopy imaging information into a plurality of tiles;
generate the second imaging information by separately applying the gradient-based distance transform to each of the tiles; and
generate the at least one image by stitching together the second imaging information.

9. The computer-accessible medium of claim 1, wherein the computer arrangement is further configured to apply the gradient-based distance transform to:

identify (i) in-focus voxels in the first imaging information and (ii) out-of-focus voxels in the first imaging information;
minimize an effect of the out-of-focus voxels; and
maximize the effect of the in-focus voxels.

10. The computer-accessible medium of claim 1, wherein the at least one image is at least one gigapixel image having a 360° horizontal field-of-view.

11. The computer-accessible medium of claim 1, wherein the at least one image includes at least one of (i) a bounded view of the at least one anatomical structure, (ii) a structural view of the at least one anatomical structure, or (iii) a classification view of the at least one anatomical structure.

12. The computer-accessible medium of claim 1, wherein the at least one anatomical structure is at least one of (i) at least one neurite or (ii) at least one cell body.

13. The computer-accessible medium of claim 1, wherein the at least one biological sample is brain tissue.

14. The computer-accessible medium of claim 1, wherein the gradient-based distance transform further includes:
a) determining the intensity value for further neighboring voxels of the particular neighbor voxel;
b) determining a further particular neighbor voxel of the further neighboring voxels that has the highest intensity;
c) adding the intensity value for particular neighbor voxel to the further particular neighbor voxel; and
d) iterating procedures (a)-(c).

15. A system for generating at least one image of at least one anatomical structure in at least one biological sample, comprising:
a computer arrangement configured to:
receive first wide field microscopy imaging information for the biological sample;
generate second imaging information by applying a gradient-based distance transform to the first imaging information and further applying the gradient-based distance transform to:
identify (i) in-focus voxels in the first imaging information and (ii) out-of-focus voxels in the first imaging information;
minimize an effect of the out-of-focus voxels; and
maximize the effect of the in-focus voxels; and
generate the at least one image based on the second imaging information.

16. A method for generating at least one image of at least one anatomical structure in at least one biological sample, comprising:
receiving first wide field microscopy imaging information for the biological sample; generating second imaging information by applying a gradient-based distance transform to the first imaging information,
wherein the gradient-based distance transform further comprises:
determining a global minimum intensity value based on voxels in the first imaging information;
determining at least one seed voxel based on the global minimum intensity value;
determining an intensity value for neighboring voxels of the at least one seed voxel;
determining a particular neighbor voxel of the neighboring voxels that has a highest intensity; and
adding the intensity value for the at least one seed voxel to the particular neighbor voxel; and using a computer hardware arrangement, generating the at least one image based on the second imaging information.

17. A non-transitory computer-accessible medium having stored thereon computer-executable instructions for generating at least one image of at least one anatomical structure in at least one biological sample, wherein, when a computing arrangement executes the instructions, the computing arrangement is configured to perform procedures comprising:
receiving wide-field microscopy (WFM) imaging information for the biological sample; identifying (i) in-focus voxels in the WFM imaging information and (ii) out-of-focus voxels in the WFM imaging information;
minimizing an effect of the out-of-focus voxels with a penalized voxel weighting; maximizing the effect of the in-focus voxels; and
generating the at least one image based on the minimized out-of-focus voxels and the maximized in-focus voxels.

18. A method for visualizing wide-field microscopy (WFM) imaging information, comprising:
receiving WFM imaging information related to a region of interest of at least one anatomical structure;
partitioning the WFM imaging information into a plurality of first image tiles;
generating a plurality of second image tiles by applying a feature extraction procedure to the first image tiles including penalizing out of focus voxels in a particular image tile of the first image tiles and rewarding in focus voxels in the particular image tile to extract cell features;
stitching the second image tiles into a visualization data set; and
using a computer hardware arrangement, performing the visualization based on the stitched second image tiles.

19. The method of 18, further comprising generating the second image tiles by performing an anisotropic diffusion procedure on each of the first image tiles.

20. The method of claim 19, further comprising generating the second image tiles by performing a gradient-based distance transform on each of the first image tiles.

21. The method of claim 20, further comprising generating the second image tiles by performing a tube enhancement procedure and a plate enhancement procedure on each of the first image tiles.

22. A non-transitory computer-accessible medium having stored thereon computer-executable instructions for generating at least one image of at least one anatomical structure in at least one biological sample, wherein, when a computing arrangement executes the instructions, the computing arrangement is configured to perform procedures comprising:
receiving first wide field microscopy imaging information for the biological sample; generating second imaging information by applying a gradient-based distance transform to the first imaging information;
generating the at least one image based on the second imaging information; and
apply the gradient-based distance transform to:
identify (i) in-focus voxels in the first imaging information and (ii) out-of-focus voxels in the first imaging information;
minimize an effect of the out-of-focus voxels; and
maximize the effect of the in-focus voxels.

* * * * *